(12) United States Patent
Fyke et al.

(10) Patent No.: US 9,274,698 B2
(45) Date of Patent: Mar. 1, 2016

(54) ELECTRONIC DEVICE AND METHOD OF CONTROLLING SAME

(75) Inventors: Steven Fyke, Waterloo (CA); Alexander Kornilovsky, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 1936 days.

(21) Appl. No.: 11/925,619

(22) Filed: Oct. 26, 2007

(65) Prior Publication Data

US 2009/0109182 A1    Apr. 30, 2009

(51) Int. Cl.
G06F 3/041    (2006.01)
G06F 3/0488    (2013.01)

(52) U.S. Cl.
CPC ..................... G06F 3/0488 (2013.01)

(58) Field of Classification Search
USPC ......................................................... 345/173
See application file for complete search history.

(56) References Cited

U.S. PATENT DOCUMENTS

| | | | |
|---|---|---|---|
| 5,231,698 A * | 7/1993 | Forcier ........................ | 715/273 |
| 5,347,295 A * | 9/1994 | Agulnick et al. ............ | 345/156 |
| 5,523,775 A * | 6/1996 | Capps .......................... | 345/179 |
| 5,666,552 A * | 9/1997 | Greyson et al. ............. | 715/210 |
| 5,739,946 A | 4/1998 | Iwanaga et al. | |
| 6,073,036 A | 6/2000 | Heikkinen | |
| 6,169,538 B1 | 1/2001 | Nowlan et al. | |
| 6,211,856 B1 | 4/2001 | Choi et al. | |
| 6,240,430 B1 * | 5/2001 | Deike et al. ................. | 715/210 |
| 6,287,485 B1 | 9/2001 | Akashi et al. | |
| 6,894,677 B2 | 5/2005 | Kazmaier et al. | |
| 6,956,979 B2 * | 10/2005 | Janakiraman et al. ........ | 382/301 |
| 7,062,723 B2 * | 6/2006 | Smith et al. .................... | 715/860 |
| 7,197,718 B1 | 3/2007 | Westerman et al. | |
| 7,212,332 B2 | 5/2007 | Chee | |
| 2002/0080123 A1 | 6/2002 | Kennedy et al. | |
| 2003/0068088 A1 | 4/2003 | Janakiraman et al. | |
| 2004/0204821 A1 | 10/2004 | Tu | |
| 2005/0093826 A1 | 5/2005 | Huh | |
| 2005/0237310 A1 | 10/2005 | Fabritius et al. | |
| 2006/0059437 A1 | 3/2006 | Conklin | |
| 2006/0077179 A1 | 4/2006 | Hsu et al. | |
| 2006/0161870 A1 | 7/2006 | Hotelling et al. | |

(Continued)

FOREIGN PATENT DOCUMENTS

DE        19519417         11/1996
DE     102005056459 A1      1/2007

(Continued)

OTHER PUBLICATIONS

European Search Report 07119388.2; Jan. 17, 2008.

(Continued)

*Primary Examiner* — Dorothy Harris
(74) *Attorney, Agent, or Firm* — Fish & Richardson P.C.

(57) ABSTRACT

A system and method is disclosed that provides for character or text selection and editing. The text and character selection is made by user contact with a touch sensitive screen. In order to allow for refinement of the selection, a second expanded view is implemented as compared to the original display configuration of the screen. Furthermore, the selection is described in relation to two endpoints of the block of text. Additionally, a point is specified as the point desired for insertion of the selected text. The expanded view is implemented along with the original view as required when making character selection.

25 Claims, 16 Drawing Sheets

(56) References Cited

U.S. PATENT DOCUMENTS

| | | | |
|---|---|---|---|
| 2006/0189278 A1* | 8/2006 | Scott | 455/90.3 |
| 2006/0218492 A1* | 9/2006 | Andrade | 715/523 |
| 2006/0267803 A1 | 11/2006 | Mathis | |
| 2007/0075922 A1 | 4/2007 | Jessop | |
| 2007/0250786 A1* | 10/2007 | Jeon et al. | 715/765 |
| 2007/0260981 A1* | 11/2007 | Kim et al. | 715/531 |
| 2008/0036743 A1* | 2/2008 | Westerman et al. | 345/173 |
| 2008/0055269 A1* | 3/2008 | Lemay et al. | 345/173 |
| 2008/0122796 A1* | 5/2008 | Jobs et al. | 345/173 |
| 2008/0158185 A1 | 7/2008 | Westerman | |
| 2008/0165142 A1* | 7/2008 | Kocienda et al. | 345/173 |
| 2008/0167081 A1 | 7/2008 | Eng | |
| 2009/0007026 A1* | 1/2009 | Scott | 715/865 |
| 2010/0179958 A1* | 7/2010 | Carr | 707/758 |

FOREIGN PATENT DOCUMENTS

| | | | |
|---|---|---|---|
| EP | 1847915 A | 10/2007 | |
| EP | 1993024 | 11/2008 | |
| EP | 1993030 | 11/2008 | |
| WO | 2006/020305 A | 2/2006 | |
| WO | 2007/037809 A | 4/2007 | |
| WO | 2007082290 A3 | 7/2007 | |

OTHER PUBLICATIONS

Office Action; Korean Patent App. No. 10-2008-0104772; issued May 24, 2010.

Canadian Intellectual Property Office, office action issued in CA application 2,640,785, dated Dec. 15, 2010, 4 pages.

European Patent Office, office action issued in EP application 07119388.2, dated Aug. 28, 2008, 5 pages.

Esmaiel Jabbari et al., "Swelling characteristics of acrylic acid polyelectrolyte hydrogel in a DC electric field" Smart Materials and Structures (2007), 1 page.

Frost & Sullivan, Smart Materials: Emerging Markets for Intelligent Gels, Ceramics, Alloys, and Polymers published by Technical Insights, Inc. and available online www.marketresearch.com, Jul. 31, 2002, 2 pages.

Jason Kottke, kottke.org, New IPhone Features, weblog, last posting date Jul. 5, 2007, 16 pages.

State Intellectual Property Office of People's Republic of China, First Office Action issued in CN patent application No. 200810166791.X (includes English language translation), issued Dec. 12, 2011, 12 pages.

Chinese Intellectual Property Office, Second Office Action issued in Chinese patent application No. 200810166791.X, dated Sep. 18, 2012, 8 pages (included English language translation).

Canadian Intellectual Property Office, Office Action issued in Canadian Patent Application No. 2,640,785, dated May 10, 2012, 2 pages.

* cited by examiner

ELECTRONIC DEVICE AND METHOD OF CONTROLLING SAME

FIELD

The present disclosure is directed toward a handheld electronic device or a handheld communication device, and more particularly, to character or text selection on a touch sensitive screen using an original display configuration and an expanded view to make the selection.

BACKGROUND

With the advent of more robust wireless communications systems, compatible handheld communication devices are becoming more prevalent, as well as advanced. In a broader sense, these devices are referred to as handheld electronic devices, which include devices without communication functions. Where in the past such handheld communication devices typically accommodated either voice (cell phones) or text transmission (pagers and PDAs), today's consumer often demands a combination device capable of performing both types of transmissions, including sending and receiving e-mail. Furthermore, these devices are capable of sending and receiving other types of data including data to enable the listening of audio, and viewing of websites, and still and moving images. The suppliers of such mobile communication devices and underlying service providers are anxious to meet these demands, but the combination of voice and textual messaging, as well as other functionalities such as those found in PDAs, have caused designers to have to improve the functionality as related to viewing and editing of documents and other data on these electronic devices.

In recent years, the use of touch sensitive screens on electronic devices has become common. These touch sensitive screens generally respond to any touching including the use of a stylus and a human digit. Depending on the size of the device and screen, the need for accurate control can be appreciated. Some icons or selectable objects presented on the screen are large in order to enable the user to accurately select the individual icon or selectable object, while other views such as text displayed on the screen require greater accuracy in the selection of the items. As the size of the display screen decreases, the need for accurate placement of the cursor can be accentuated. This need for accuracy is amplified when both the screen of the device and the displayed text are small. The typical solution for accurate placement involves using a stylus to select a point on the screen. Since the tip of the stylus is typically of similar size to the text shown on the display screen, accurate selection of the appropriate point is possible.

However, there are instances where a stylus is not desirable or is unavailable. Typically, the electronic device is provided with a means for holding or storing the stylus when the stylus is not in use. Thus if accurate selection is required, the user must remove the stylus from storage before making a selection on the screen. Furthermore, the stylus can be lost by the user. A device with a stylus is larger due to the stylus and its storage requirements. The additional space required for storage of the stylus is often not desirable. Thus, another solution to accurately select a point is needed.

BRIEF DESCRIPTION OF THE DRAWINGS

Exemplary methods and arrangements conducted and configured according to the advantageous solutions presented herein are depicted in the accompanying drawings wherein:

FIG. 17 illustrates an exemplary Dvorak keyboard layout;

FIG. 18 illustrates a QWERTY keyboard layout paired with a traditional ten-key keyboard;

FIG. 19 illustrates ten digits comprising the numerals 0-9 arranged in a traditional ITU Standard E.161 numeric telephone keypad layout, including the * and # flanking the 0 key;

FIG. 20 illustrates a traditional or standard phone key arrangement or layout according to the ITU Standard E.161 including both numerals and letters.

DETAILED DESCRIPTION

Figure 1:
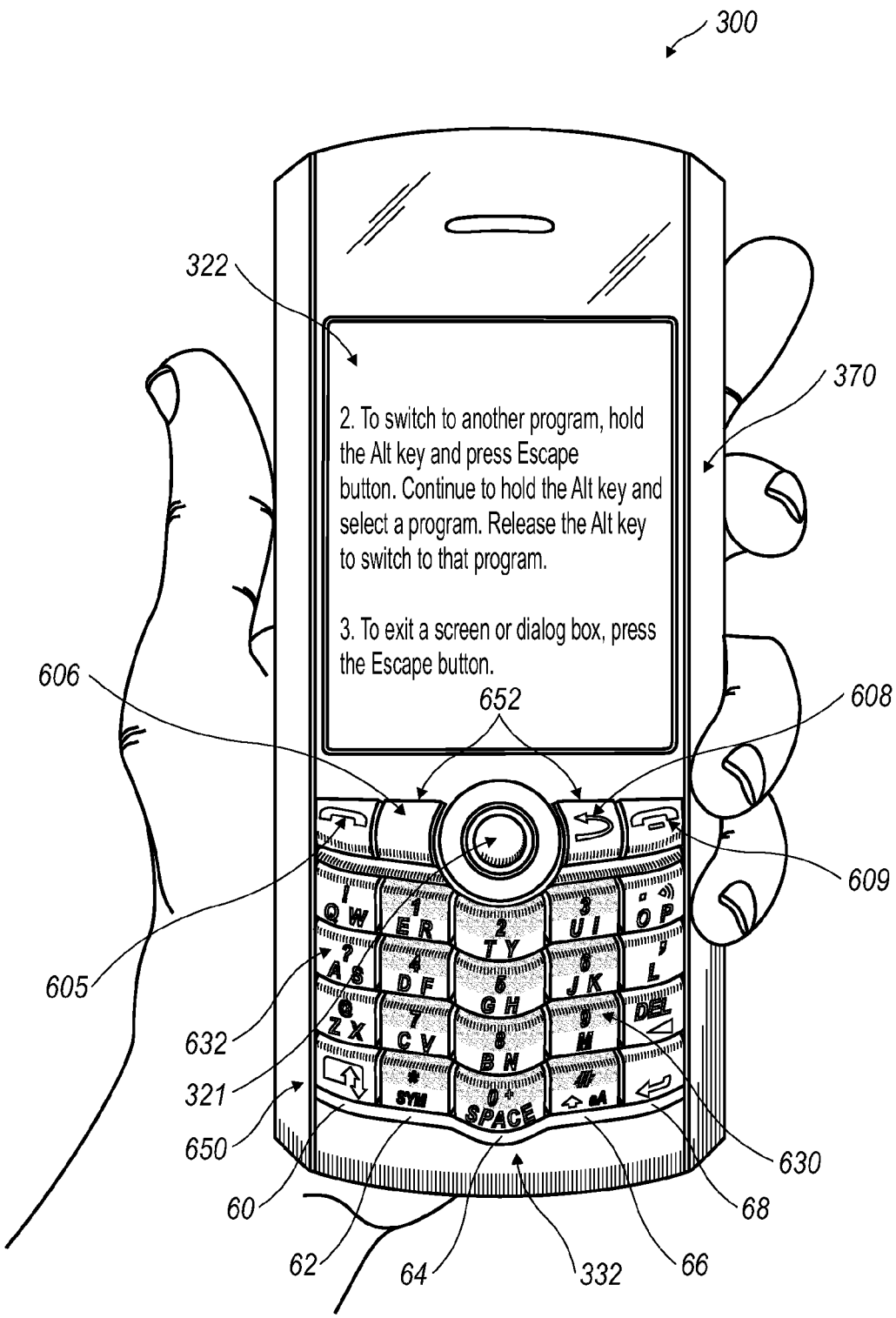
FIG. 1 depicts a handheld communication device with an original display configuration shown on a touch sensitive screen cradled in the palm of a user's hand.
Figure 21:
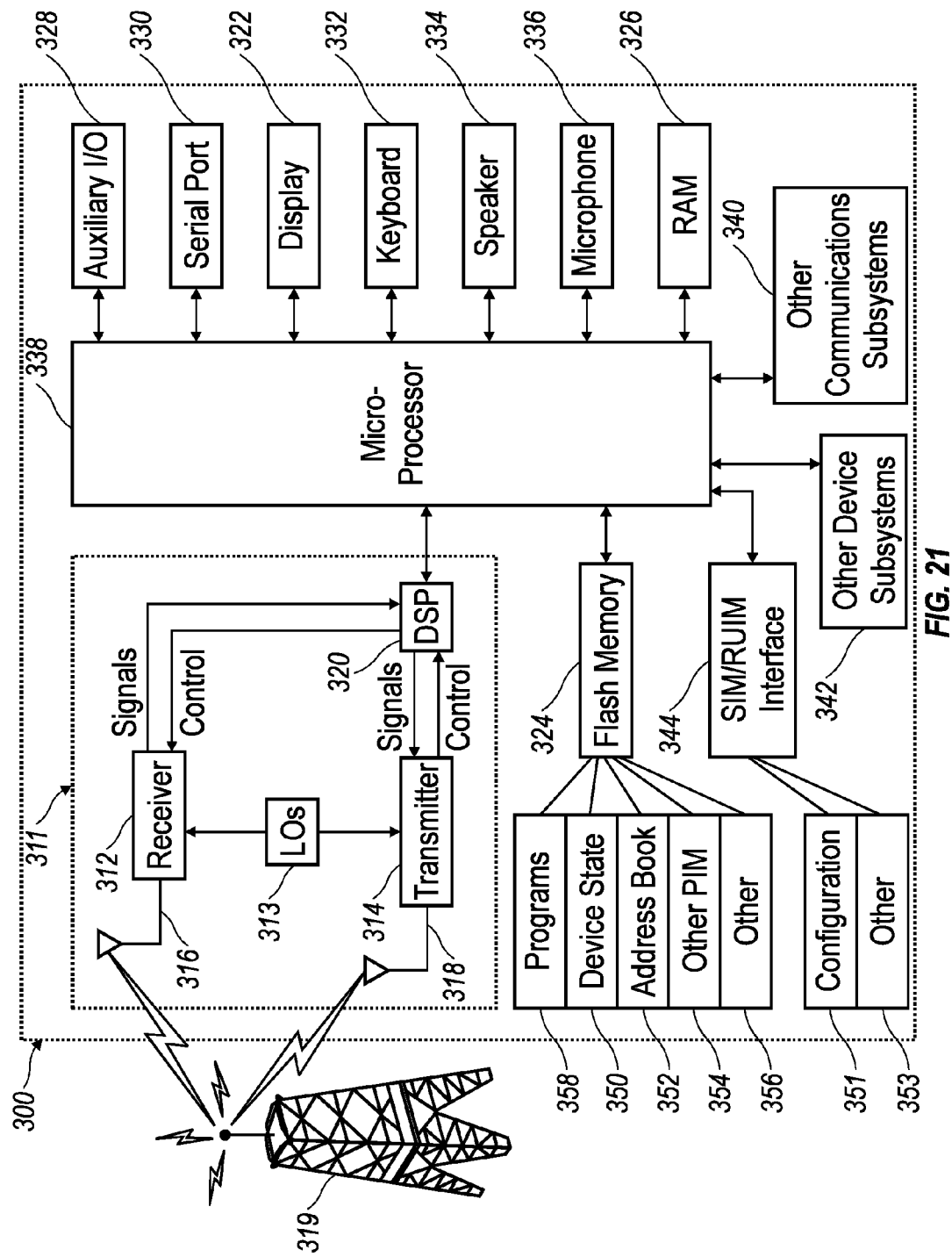
FIG. 21 is a block diagram representing a wireless handheld communication device interacting in a communication network.

An exemplary handheld electronic device 300 is shown in FIG. 1, and the device's cooperation in a wireless network 319 is exemplified in the block diagram of FIG. 21. These figures are exemplary only, and those persons skilled in the art will appreciate the additional elements and modifications necessary to make the device 300 work in particular network environments.

The block diagram of FIG. 21 denotes the device's 300 inclusion of a microprocessor 338 that controls the operation of the device 300. A communication subsystem 311 performs all communication transmission and reception with the wireless network 319. The microprocessor 338 further connects with an auxiliary input/output (I/O) subsystem 328, a serial port (preferably a Universal Serial Bus port) 330, a display 322, a keyboard 332, a speaker 334, a microphone 336, random access memory (RAM) 326, and flash memory 324.

Other communication subsystems 340 and other device subsystems 342 are generally indicated as being functionally connected with the microprocessor 338 as well. An example of a communication subsystem 340 is that of a short range communication system such as BLUETOOTH® communication module or a Wi-Fi communication module (a communication module in compliance with IEEE 802.11b) and associated circuits and components. Additionally, the microprocessor 338 is able to perform operating system functions and preferably enables execution of software applications on the communication device 300.

The included auxiliary I/O subsystem 328 can take the form of a variety of different navigation tools (multidirectional or single-directional) such as a trackball navigation tool 321 as illustrated in the exemplary embodiment shown in FIG. 1, or a thumbwheel, a navigation pad, or a joystick, or the like. These navigation tools are preferably located on the front surface of the device 300 but may be located on any exterior surface of the device 300. Other auxiliary I/O subsystems 328 can include external display devices and externally connected keyboards (not shown). While the above examples have been provided in relation to the auxiliary I/O subsystem 328, other subsystems capable of providing input or receiving output from the handheld electronic device 300 are considered within the scope of this disclosure. Additionally, other keys may be placed along the side of the device 300 to function as escape keys, volume control keys, scrolling keys, power switches, or user programmable keys, and may likewise be programmed accordingly.

As may be appreciated from FIG. 1, the handheld communication device 300 comprises a lighted display 322 located above a keyboard 332 constituting a user input and suitable for accommodating textual input to the handheld communication device 300. The front face of the device has a keyfield 650 that includes menu keys 652, alphanumeric keys 630, alphabetic keys 632, numeric keys 42, and other function keys as shown in FIG. 1. As shown, the handheld device 300 is of unibody construction, also known as a "candy-bar" design.

Keys, typically of a push-button or push-pad nature, perform well as data entry devices but present problems to the user when they must also be used to affect navigational control over a screen-cursor. In order to solve this problem the present handheld electronic device 300 preferably includes an auxiliary input 328 that acts as a cursor navigational tool and which is also exteriorly located upon the front face of the device 300. Its front face location is particularly advantageous because it makes the tool easily thumb-actuable like the keys of the keyboard. In a particularly useful embodiment, the navigational tool is a trackball navigational tool 321 which is easily utilized to instruct two-dimensional screen cursor movement in substantially any direction, as well as act as an actuator when the ball 321 is depressed like a button. The placement of the trackball 321 is preferably above the keyboard 332 and below the display screen 322; here, it avoids interference during keyboarding and does not block the user's view of the display screen 322 during use. (See FIG. 1).

As illustrated in at least FIG. 1, the present disclosure is directed to a handheld electronic device 300 configured to send and receive text messages. The device includes a hand cradleable body configured to be held in one hand by an operator of the device during text entry. A display 322 is included that is located on a front face 370 of the body and upon which information is displayed to the operator during text entry. A key field 650 is also located on the front face 370 of the elongate body and which comprises a plurality of keys including plurality of alphanumeric keys, symbol keys, and function keys. A trackball navigation tool 321 is also located on the front face 370 of the body. The alphanumeric input keys comprise a plurality of alphabetic keys 632 having letters associated therewith. The order of the letters of the alphabetic keys 632 on the presently disclosed device can be described as being of a traditional, but non-ITU Standard E.161 layout.

The handheld electronic device 300 is also configured to send and receive voice communications such as mobile telephone calls. At least one key of the key field 650 is positioned adjacent to the trackball navigation tool and that key has a circular arc-shaped edge conformance fitting to a circular arc-shaped boundary about the trackball navigation tool 321. To facilitate telephone calls, two call keys 605, 609 oppositely and laterally flank the trackball navigation tool. One of the two call keys is a call initiation key 605 and the other is a call termination key 609.

The key 606 positioned adjacent to the trackball navigation tool 321 is a menu key that upon actuation displays an available action menu on the display in dependence of the currently running application on the device 300. Additionally, an escape or back key 608 can be provided. As shown, the back key 608 is located on the opposite side of the trackball navigation tool 321.

Furthermore, the device is equipped with components to enable operation of various programs, as shown in FIG. 21. In an exemplary embodiment, the flash memory 324 is enabled to provide a storage location for the operating system, device programs 358, and data. The operating system is generally configured to manage other application programs 358 that are also stored in memory 324 and executable on the processor 338. The operating system honors requests for services made by application programs 358 through predefined application program 358 interfaces. More specifically, the operating system typically determines the order in which multiple applications 358 executed on the processor 338 and the execution time allotted for each application 358, manages the sharing of memory 324 among multiple applications 358, handles input and output to and from other device subsystems 342, and so on. In addition, users can typically interact directly with the operating system through a user interface usually including the keyboard 332 and display screen 322. While in an exemplary embodiment the operating system is stored in flash memory 324, the operating system in other embodiments is stored in read-only memory (ROM) or similar storage element (not shown). As those skilled in the art will appreciate, the operating system, device application 358 or parts thereof may be loaded in RAM 326 or other volatile memory.

In one exemplary embodiment, the flash memory 324 contains programs/applications 358 for execution on the device 300 including an address book 352, a personal information manager (PIM) 354, and the device state 350. Furthermore, programs 358 and other information 356 including data can be segregated upon storage in the flash memory 324 of the device 300.

When the device 300 is enabled for two-way communication within the wireless communication network 319, it can send and receive signals from a mobile communication service. Examples of communication systems enabled for two-way communication include, but are not limited to, the General Packet Radio Service (GPRS) network, the Universal Mobile Telecommunication Service (UTMS) network, the Enhanced Data for Global Evolution (EDGE) network, and the Code Division Multiple Access (CDMA) network and those networks, generally described as packet-switched, narrowband, data-only technologies which are mainly used for short burst wireless data transfer. For the systems listed above, the communication device 300 must be properly enabled to transmit and receive signals from the communication network 319. Other systems may not require such identifying information. GPRS, UMTS, and EDGE require the use of a Subscriber Identity Module (SIM) in order to allow communication with the communication network 319. Likewise, most CDMA systems require the use of a Removable Identity Module (RUIM) in order to communicate with the CDMA network. The RUIM and SIM card can be used in multiple different communication devices 300. The communication device 300 may be able to operate some features without a SIM/RUIM card, but it will not be able to communicate with the network 319. A SIM/RUIM interface 344 located within the device 300 allows for removal or insertion of a SIM/RUIM card (not shown). The SIM/RUIM card features memory and holds key configurations 351, and other information 353 such as identification and subscriber related information. With a properly enabled communication device 300, two-way communication between the communication device 300 and communication network 319 is possible.

If the communication device 300 is enabled as described above or the communication network 319 does not require such enablement, the two-way communication enabled device 300 is able to both transmit and receive information from the communication network 319. The transfer of communication can be from the device 300 or to the device 300. In order to communicate with the communication network 319, the device 300 in the presently described exemplary embodiment is equipped with an integral or internal antenna 318 for transmitting signals to the communication network 319. Likewise the communication device 300 in the presently described exemplary embodiment is equipped with another antenna 316 for receiving communication from the communication network 319. These antennae (316, 318) in another exemplary embodiment are combined into a single antenna (not shown). As one skilled in the art would appreciate, the antenna or antennae (316, 318) in another embodiment are externally mounted on the device 300.

When equipped for two-way communication, the communication device 300 features a communication subsystem 311. As is well known in the art, this communication subsystem 311 is modified so that it can support the operational needs of the device 300. The subsystem 311 includes a transmitter 314 and receiver 312 including the associated antenna or antennae (316, 318) as described above, local oscillators (LOs) 313, and a processing module 320 which in the presently described exemplary embodiment is a digital signal processor (DSP) 320.

It is contemplated that communication by the device 300 with the wireless network 319 can be any type of communication that both the wireless network 319 and device 300 are enabled to transmit, receive and process. In general, these can be classified as voice and data. Voice communication is communication in which signals for audible sounds are transmitted by the device 300 through the communication network 319. Data is all other types of communication that the device 300 is capable of performing within the constraints of the wireless network 319.

Example device applications that can depend on such data include email, contacts and calendars. For each such application synchronization with home-based versions on the applications can be critical for either or both of their long term and short term utility. As an example, emails are often time sensitive, so substantially real time synchronization is highly desirable. Contacts, on the other hand, can be usually updated less frequently without inconvenience. Therefore, the utility of the device 300 is significantly enhanced (if not enabled) when connectable within a communication system, and particularly when connectable on a wireless basis in a network 319 in which voice, text messaging, and other data transfer are accommodated.

Figure 13:
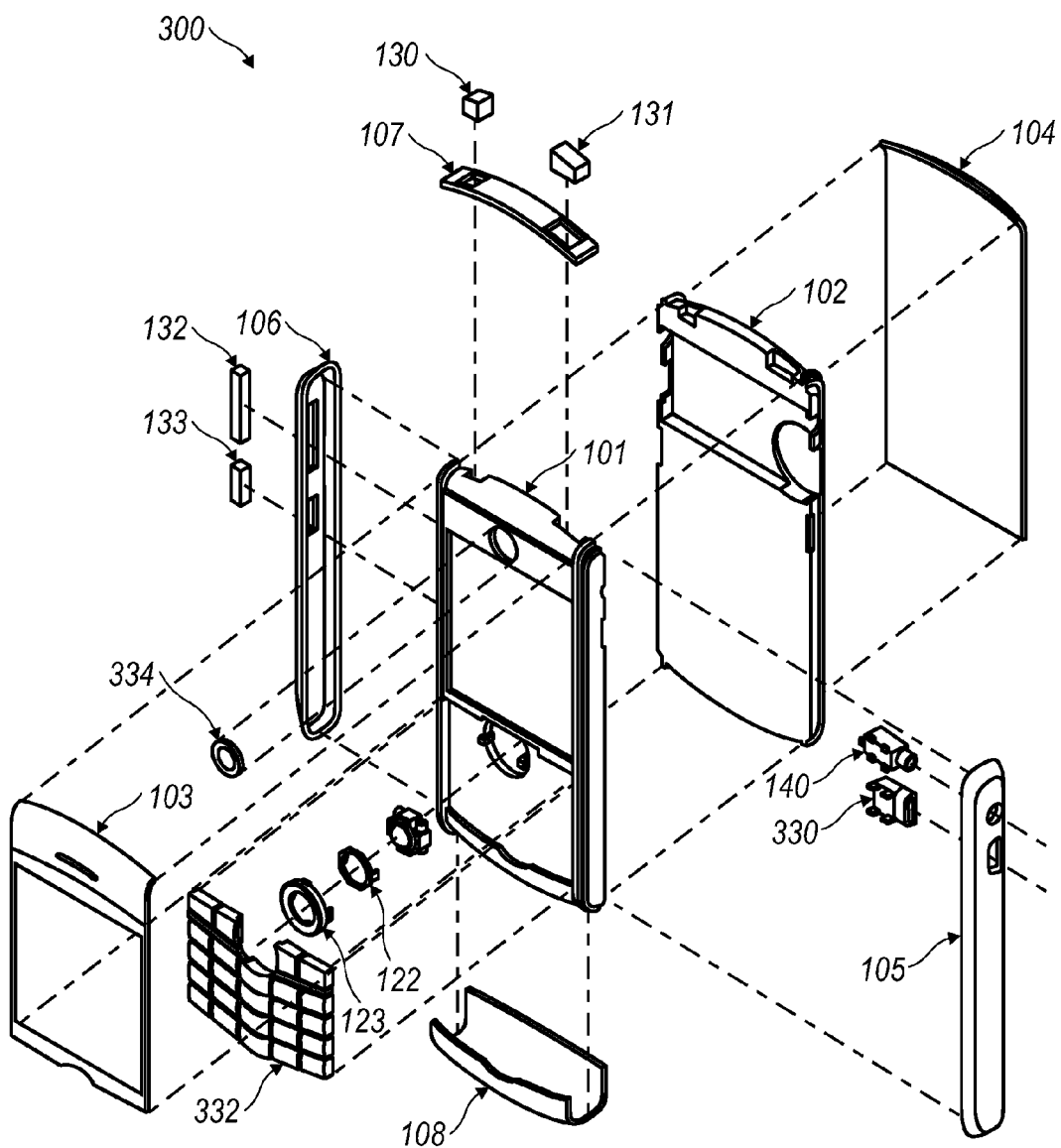
FIG. 13 is an exploded perspective view of an exemplary wireless handheld electronic device incorporating a trackball assembly.

Integration of the trackball assembly into handheld device 300 can be seen in the exploded view of FIG. 13 showing some of the typical components found in the assembly of the handheld electronic device 300. The construction of the device benefits from various manufacturing simplifications. The internal components are predominantly constructed on a single PCB (printed circuit board) 102. The keyboard 332 can be constructed from a single piece of material, and in some embodiments is made from plastic. The keyboard 332 sits over dome switches (not shown) located on the PCB 102 in a preferred embodiment. While in the presently described exemplary embodiment one switch is provided for every key on the keyboard 332, in other embodiments more than one switch or less than one switch per key are provided. The support frame 101 holds the keyboard 332 and trackball navigation tool 321 in place above the PCB 102. A lens 103 covers the display screen (not shown) to prevent damage. When assembled, the support frame 11 and the PCB 102 are fixably attached to each other and the display is positioned between the PCB 102 and support frame 101.

The trackball navigation tool 321 can be frictionally engaged with the support frame 101, but in one exemplary embodiment the trackball navigation tool 321 is removable when the device is assembled. This allows for replacement of the trackball navigation tool 321 if/when it becomes damaged or the user desires replacement with a different type of navigation tool. Other multidirectional navigation tools such as joysticks, four-way cursors, or touch pads are also considered to be within the scope of this disclosure. The trackball navigational tool 321 is fixed against the support frame 101 by locking rings 122, 123 that are removably engaged with the support frame. This configuration allows the trackball navigational tool 321 to be removed such as needed in servicing or replacement.

A serial port (preferably a Universal Serial Bus port) 330 and an earphone jack 140 are fixably attached to the PCB 102 and further held in place by right side element 105. Buttons 130-133 are attached to switches (not shown), which are connected to the PCB 102.

Final assembly involves placing the top piece 107 and bottom piece 108 in contact with support frame 101. Furthermore, the assembly interconnects right side element 105 and left side element 106 with the support frame 101, PCB 102, and lens 103. These side elements 105, 106 provide additional protection and strength to the support structure of the device 300. In a preferred embodiment, backplate 104 is removably attached to the other elements of the device.

The above mentioned elements can be combined with the present solutions which are directed to methods and arrangements for accommodating character or text selection.

Figure 11:
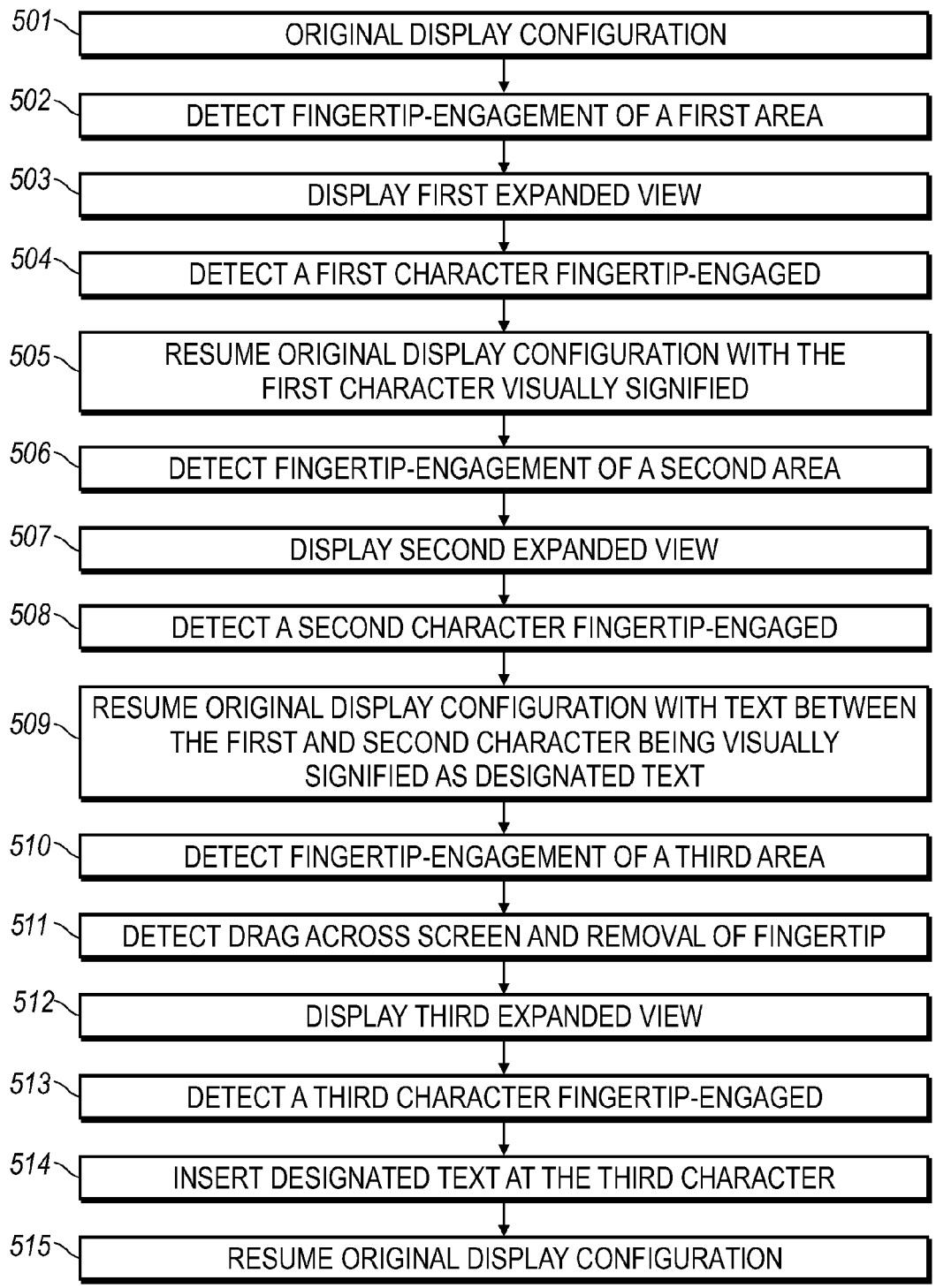
FIG. 11 is a flow chart illustrating an exemplary method for character or text selection.

An exemplary method for accommodating character or text selection is illustrated in FIG. 11. While the figure illustrates the method as continuous, the method can be stepwise or segmented as described below. Furthermore, implementations of only a portion of the method illustrated are considered within the scope of this disclosure.

In a preferred embodiment, a method displays selectable text on a touch screen 322 of the handheld electronic device 300 in which the selectable characters are smaller than an area of user contact with the touch screen. When a finger of the user is used in making the selection, the user contact with the touch screen 322 is on the order of the size of the fingertip of the user. When the fingertip is used for making a selection, at least two characters are partially covered by the area of user contact which prevents accurate selection of the desired character. This display configuration in which the selectable characters are smaller than the area of user contact is referred to as an original display configuration (block 501). Also, the method involves detecting that a first area of the touch screen 322 has been contacted by the user (block 502). The first area usually includes a plurality of characters due to the overlap of characters. Additionally, the method displays an expanded view of the first area that has been expanded to an extent that each of the at least two partially covered characters is individually sufficiently large that only one of said at least two characters can be predominantly covered by the area of user contact (block 503). Furthermore, the method detects that a first character is being user-contacted in the first expanded view by being predominantly user-contacted in the expanded view (block 504). Preferably, the first character is selected from the at least two characters. A character that is predominantly user-contacted is a character that has more user-contact than any other character shown on the display. The original display configuration is resumed with the first character being visually signified (block 505).

In an exemplary embodiment, the method for accommodating character or text selection also detects a second area encompassing a plurality of characters of which at least two have been at least partially covered by user-contact (block 506). Furthermore, the method displays a second expanded view of an area corresponding to the second area (block 507), and each of the plurality of characters being individually sufficiently large in the expanded view such that only one of said at least two characters can be predominantly covered by the user-contact. Additionally, the method involves detecting a second character that was user-contacted in the expanded view by being predominantly covered by user-contact (block 508) and resuming the original display configuration of the text with the text between the first character and said second character being visually signified as designated text (block 509).

In another embodiment, the method for accommodating character or text selection further involves detecting that a third area of the touch screen 322 has been user-contacted (block 510). The user-contact is then dragged across the touch screen 322 to a third location where a third area is defined by the user-contact. This third area encompasses a plurality of characters of which at least two have been at least partially covered by the user's contact. Then, the method detects a dragging motion of the user-contact across the screen followed by removal of the user-contact (block 511). Additionally, the method displays an expanded view of the third area upon detection that the engaging user-contact has disengaged from the touch screen (block 511). The third expanded view has been expanded to an extent that each of the at least two partially covered characters in the expanded view is individually sufficiently large that only one of said at least two characters can be predominantly covered by the user's contact. Furthermore, the method detects a third character that has been user-selected (block 513) in the third expanded view (block 512) and inserts the designated text adjacent the third character (block 514), and resumes the original display configuration (block 515). As previously mentioned, the text shown in the original display configuration of the device 300 is sized such that a user's contact overlaps more than one character of the displayed text.

While generally the engagement is generally described as user contact, the specific example of a fingertip is provided below as an illustration. However, other examples of objects that can be used to cause solid contact include at least a pen, pencil, stylus, eraser, finger, knuckle, fingernail, thumbnail, or other similar object.

Characters can be anything commonly displayed in the text field of a handheld electronic device 300. Characters include, but are not limited to letters, numerals, spaces, punctuation, and symbols. Typically, the text shown on the touch screen 322 of the electronic device 300 is sized such that it is small enough to allow multiple lines of text to be shown at the same time enabling the user to easily read the displayed text. The original display configuration is also the default view of the device. This default view of the device can be either preset or user definable. If the view is user definable, the user is allowed to adjust the amount of information shown on the screen 322 through adjustment of the font size or the like. Typically more than three lines of text are displayed while in the original display configuration. Preferably, the number of lines of text shown on the screen 322 varies from four to fifteen lines of text.

While the original display configuration provides several lines of text for viewing on the screen 322, the expanded view provides fewer lines of text and/or fewer characters. The expanded view can be described generically and likewise the description of the expanded view covers first, second, and third expanded views, as used herein. In one embodiment, the expanded view has less than four lines of text displayed on the screen 322 when the expanded view is enabled. In another embodiment, the line of the selected area and one line above and one line below the selected area are shown on the screen 322 when in the expanded view in FIG. 3. Thus, the three lines shown in the expanded view are likely to contain the text or character that the user intended on selecting. Alternatively, the text shown on the display 322 is defined in terms of the characters on the adjacent sides of the selected area. Preferably, the number of characters on either side of the selected character is less than six characters. In an exemplary embodiment, the number of characters adjacent to the selected area is on the order of four to ten. In yet another embodiment, the expanded view can be described as having characters that are individually sufficiently large that only one of the at least two characters can be predominantly covered by the user's fingertip. Exemplarily, the height of a character is slightly larger than the average size of a human fingertip. A character with a height greater than six millimeters is one example of character that would meet this requirement. Preferably, the character height is between six and fourteen millimeters. Alternatively, the width may be specified as between four and fourteen millimeters, and preferably the width is approximately six millimeters. The above described expanded views preferably retain the aspect ratios of the display screen 322, such that the text shown on the display 322 meets the above criteria and has additional text as required to complete the view. In yet another embodiment, the expanded view can be defined as a magnification of the original display configuration. Using the selected area as the center point of the expanded view, the remaining text is scaled at a predefined percentage. Preferably, the percentage of magnification of the expanded view as compared with the original view is on the order of two hundred to four hundred percent.

While the above has been described generally as a method for accommodating character or text selection, the method is preferably implemented in a software routine or other known programming technique for a handheld electronic device 300. For example, a microprocessor-run software program can be provided on the handheld electronic device 300.

Figure 2:
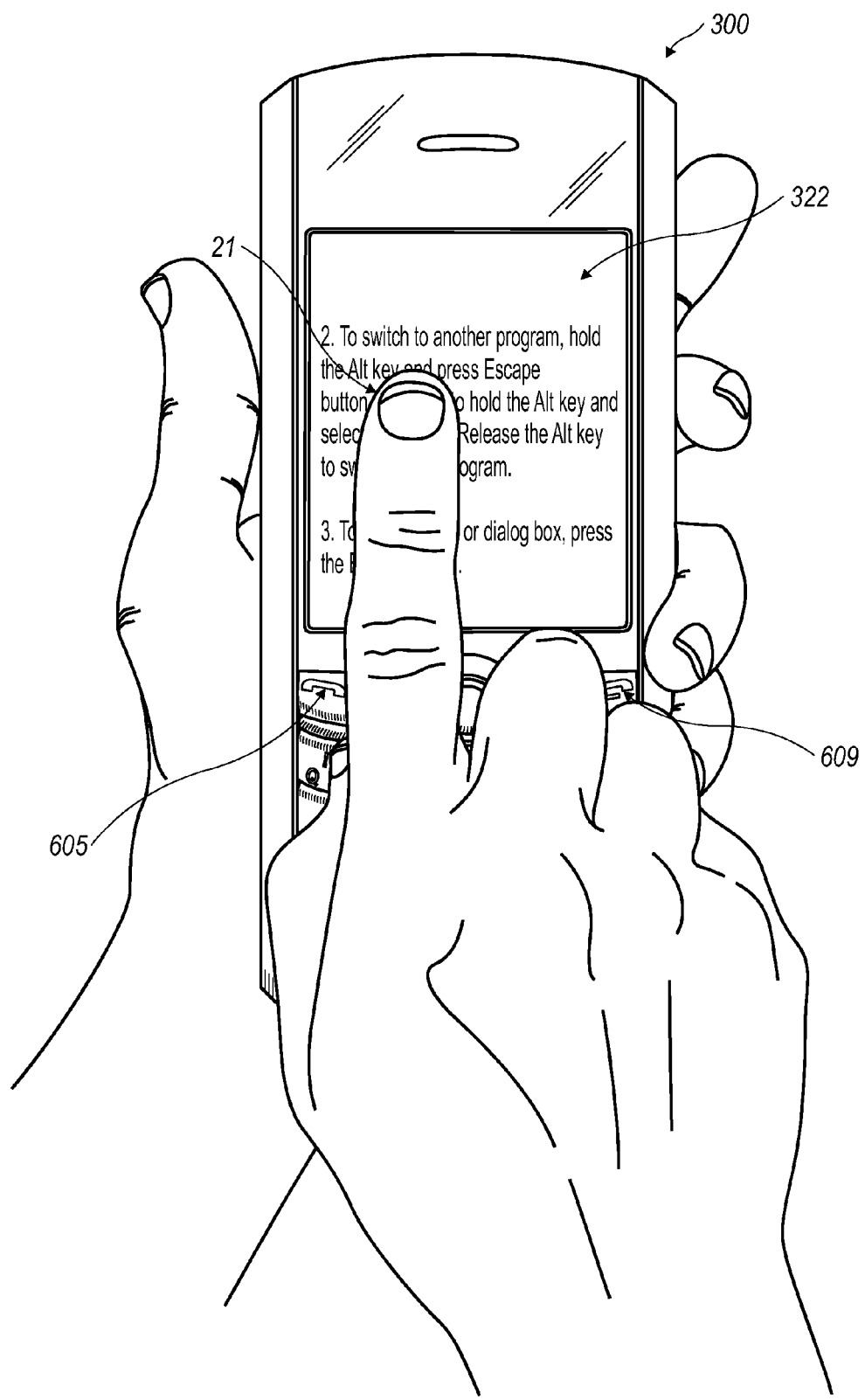
FIG. 2 depicts selection of an area on the touch sensitive screen.

As previously described, the method and apparatus for accommodating character or text selection can be further understood in relation to FIGS. 1-10. As shown in FIG. 1, the handheld electronic device 300 is cradled in the palm of a user's hand. The handheld electronic device 300 is preferably provided with a keyboard 332 to enter text data and place telephone calls. A connect/send key 605 is preferably provided to aid in the placement of a phone call. Additionally, a disconnect/end key 609 is provided. The send key 605 and end key 609 preferably are arranged in row of keys including a trackball navigation tool 321. Additionally, the row of keys with the navigation tool preferably has a menu key 606 and an escape key 608 associated therewith. The menu key 606 is used to bring up a menu and the escape key 608 is used to return to the previous screen or previous menu selection. The original display configuration is shown on the touch sensitive screen 322. The text shown on the screen 322 is provided for illustrative purposes only. In other embodiments, the display 322 includes additional headings, frames, and other organization characteristics not shown in the figure. Thus, the text that is selectable in the original display configuration may not occupy the entire screen 322. As can be seen in FIG. 2, the size of the text is smaller than the user contact such as fingertip of the user. While the description below, for illustrative purposes, refers to finger tip engagement of the screen 322, other user contact is likewise applicable. Using touch screen technology, the characters of the text shown on the touch screen 322 are selectable. However, the size of the user's fingertip is larger than a character on the display 322. Thus, when selecting a character on the display 322, there is possible overlap with adjacent characters.

The user of a handheld electronic device 300 often wishes to edit text by selecting blocks of text. Although not described in detail in this disclosure, various implementations are possible for enabling manipulation of text. Some examples of manipulation of text are given herein as examples. One type of manipulation involves copying the selected text. This can be performed through a variety of ways, usually with the user selecting a copy operation. Alternatively, the selection of text is made and subsequently the user indicates the use of the selected text. This can be through a series of keystroke commands or through selection of menu items on a graphical user interface shown on the display screen 322. Once the text is selected that will be copied, a point for insertion of the text is required. With a specified insertion point, the text is inserted at that point. Likewise, cut and delete options are possible. The cut operation involves deleting the selected text from its original position, once the insertion point is determined, and inserting the text at the selected point. The delete option is used to delete the entirety of the selected text. Other options for manipulating the selected text are possible as well. The above examples provide some illustration as to how selected text might be used. Thus, while this disclosure generally describes the manipulation of text as it relates to a cut operation, it can be understood how modifications can be made to implement copy and delete operations. In addition to menu selection of the above text manipulation functions, it is also possible to design the touch sensitive screen 322 to accept gestures for inputting of the commands. The gestures involve placing one or more fingers of the user on the touch screen 322 and moving the fingers in designated fashion to input commands.

When a user desires to select a block of text, an endpoint for the block is usually determined. As shown in FIG. 2, the user touches 21 the screen 322 of the handheld electronic device 300 in order to indicate a desired point. This point preferably is used in determining the selection of text. Since the area selected by the user does not coincide with just one character because of the overlap of characters around the area, an additional selection of the desired character is required.

Figure 3:
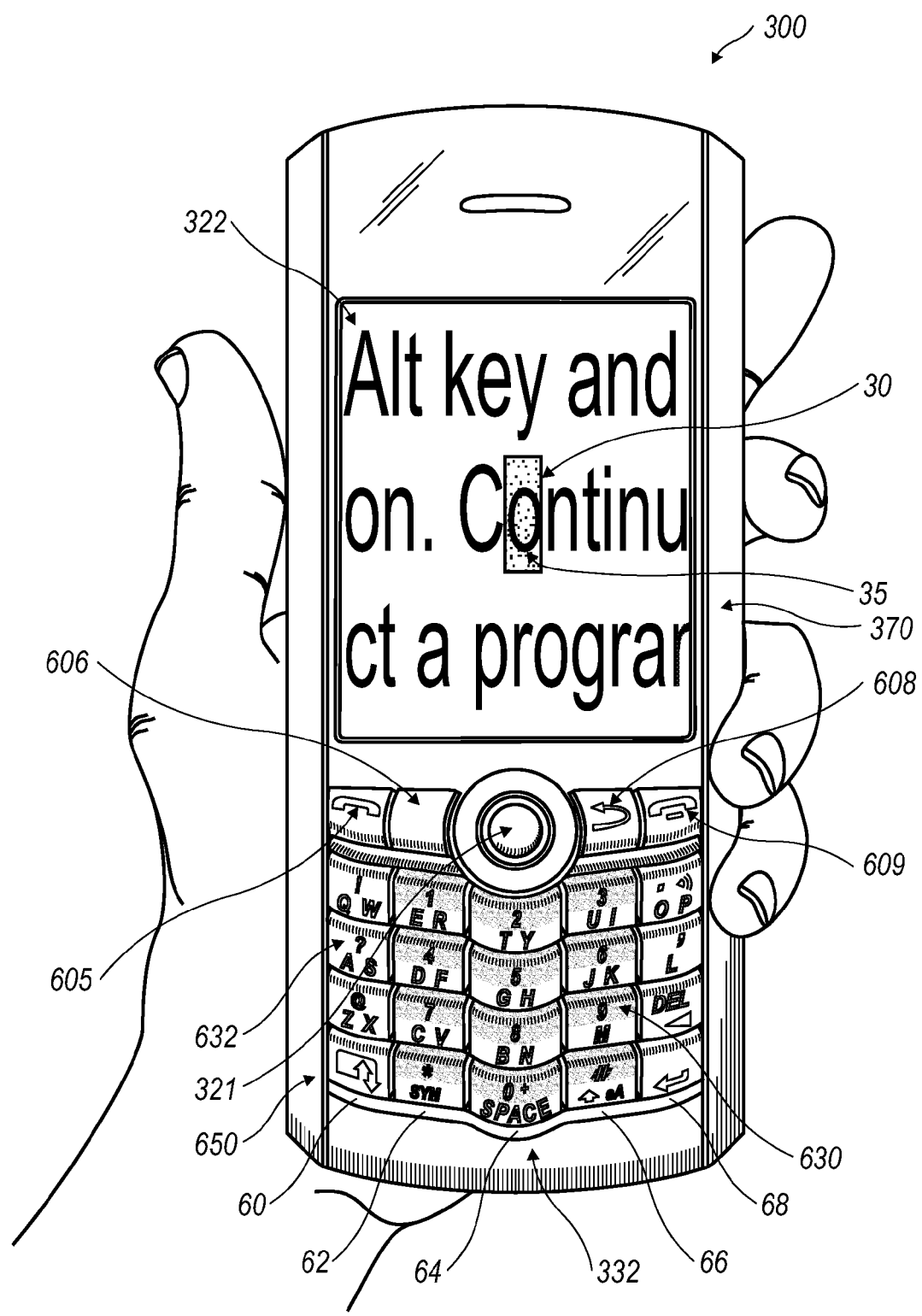
FIG. 3 depicts the expanded view and character selection shown on the touch sensitive screen of the handheld communication device.
Figure 4:
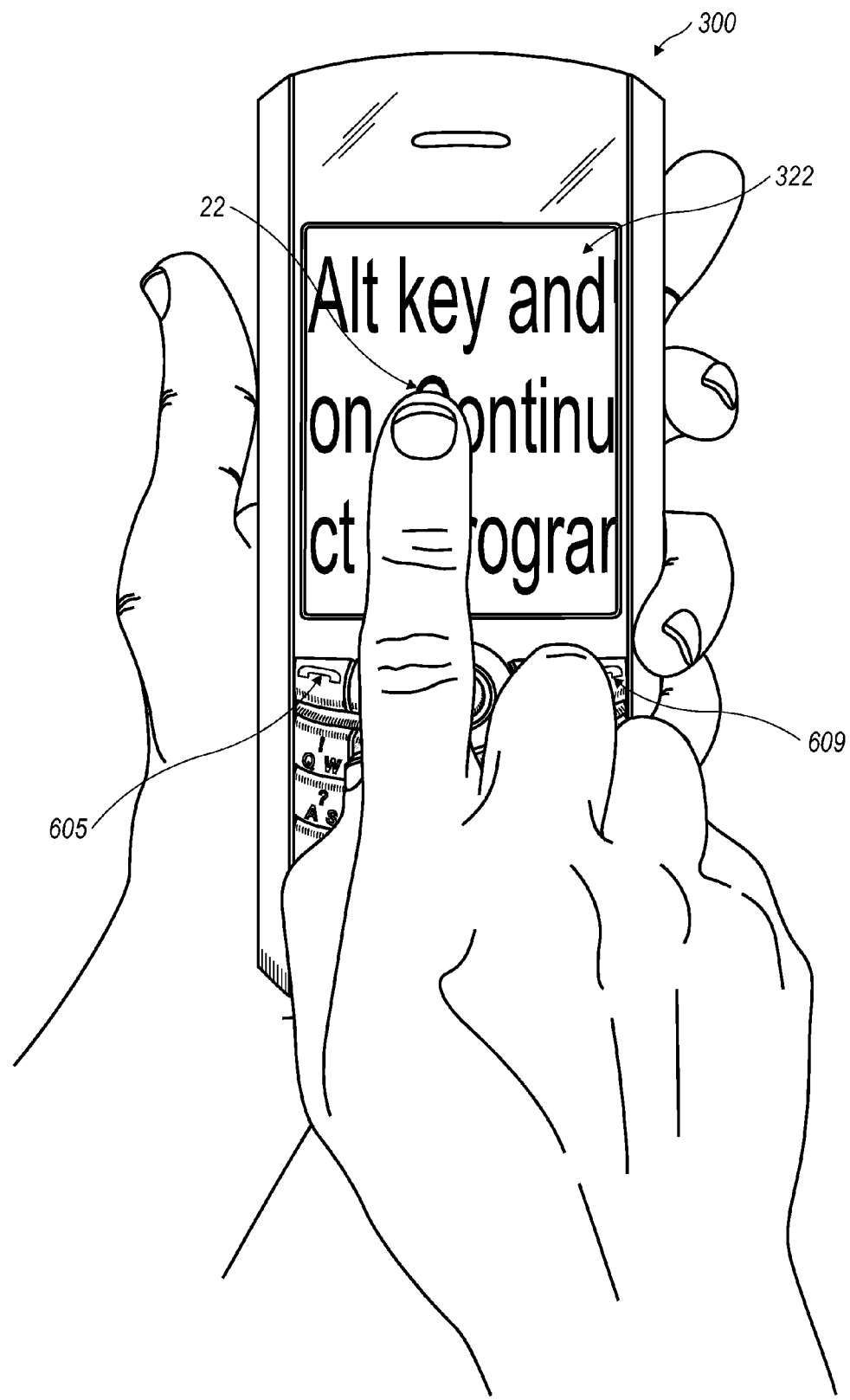
FIG. 4. depicts selection of a character on the touch sensitive screen when the expanded view is displayed.
Figure 5:
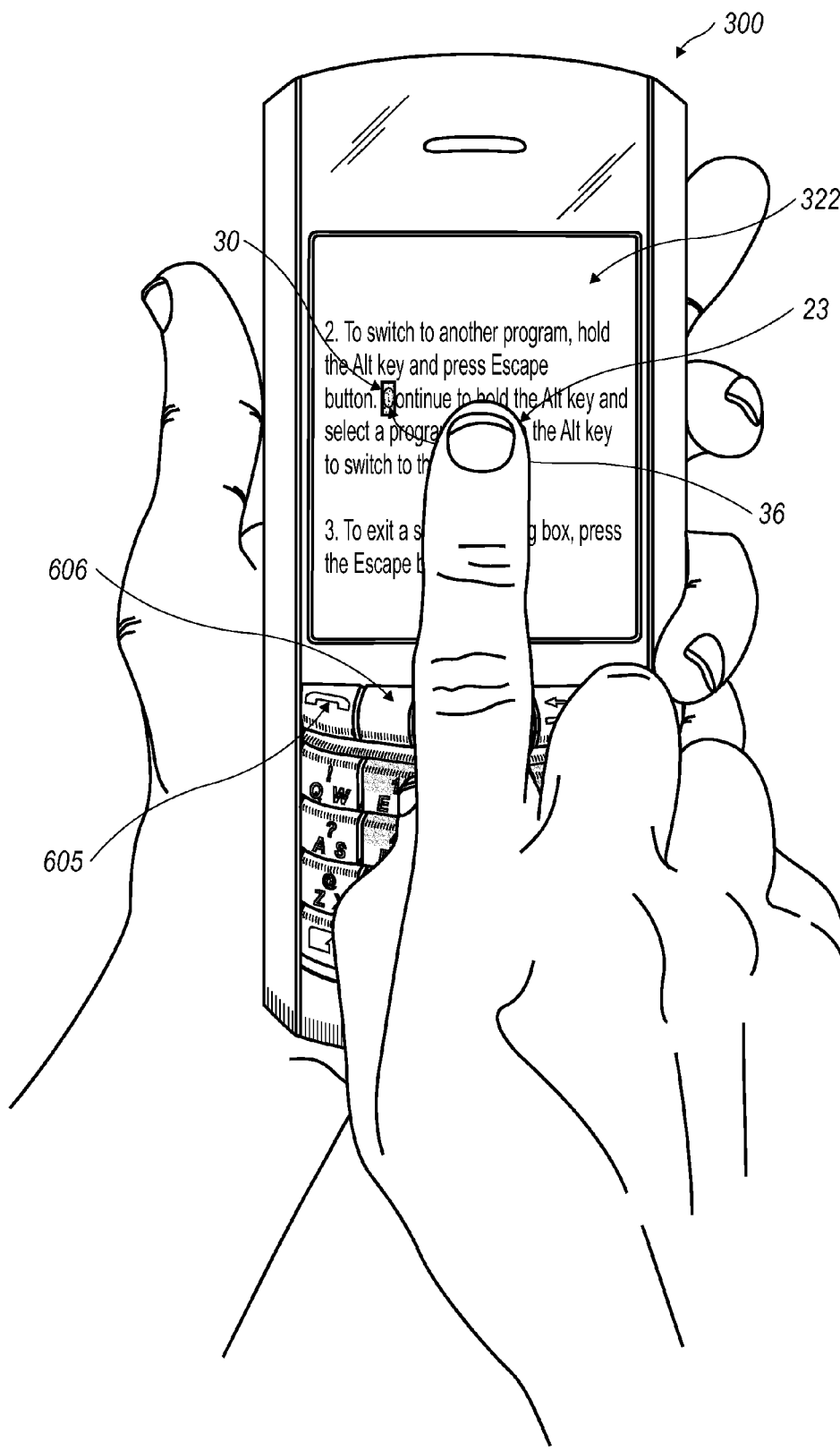
FIG. 5 depicts selection of a second area on the touch sensitive screen when the original display configuration is shown.

As shown in FIG. 3, a first expanded view is generated on the screen 322. The characters in the expanded view are individually sufficiently large such that they can be touch-selected by the user with one character being predominantly fingertip-covered. The character 35 that the program has selected as the most likely character selected by the user based upon the first touch 21 is visually signified 30. This visual signification can be, for example, a background highlighting color (as shown) or a different font color for the character or other method to signify to the user that the character is selected. Then, the user selects 22 the desired character, as shown in FIG. 4. The implementation requires detecting this selection in the first expanded view and using this selection as one desired endpoint for the text selection. Even though the above is described in relation to text selection, the selection can be used for selection of other things such as graphics or other objects. The use of the expanded view allows for a further refinement of initial selection to provide increased accuracy in the selection of a desired point on the screen 322. Once the first character has been detected, the screen 322 resumes the original display configuration with the first character visually signified, as shown in FIG. 5.

Figure 6:
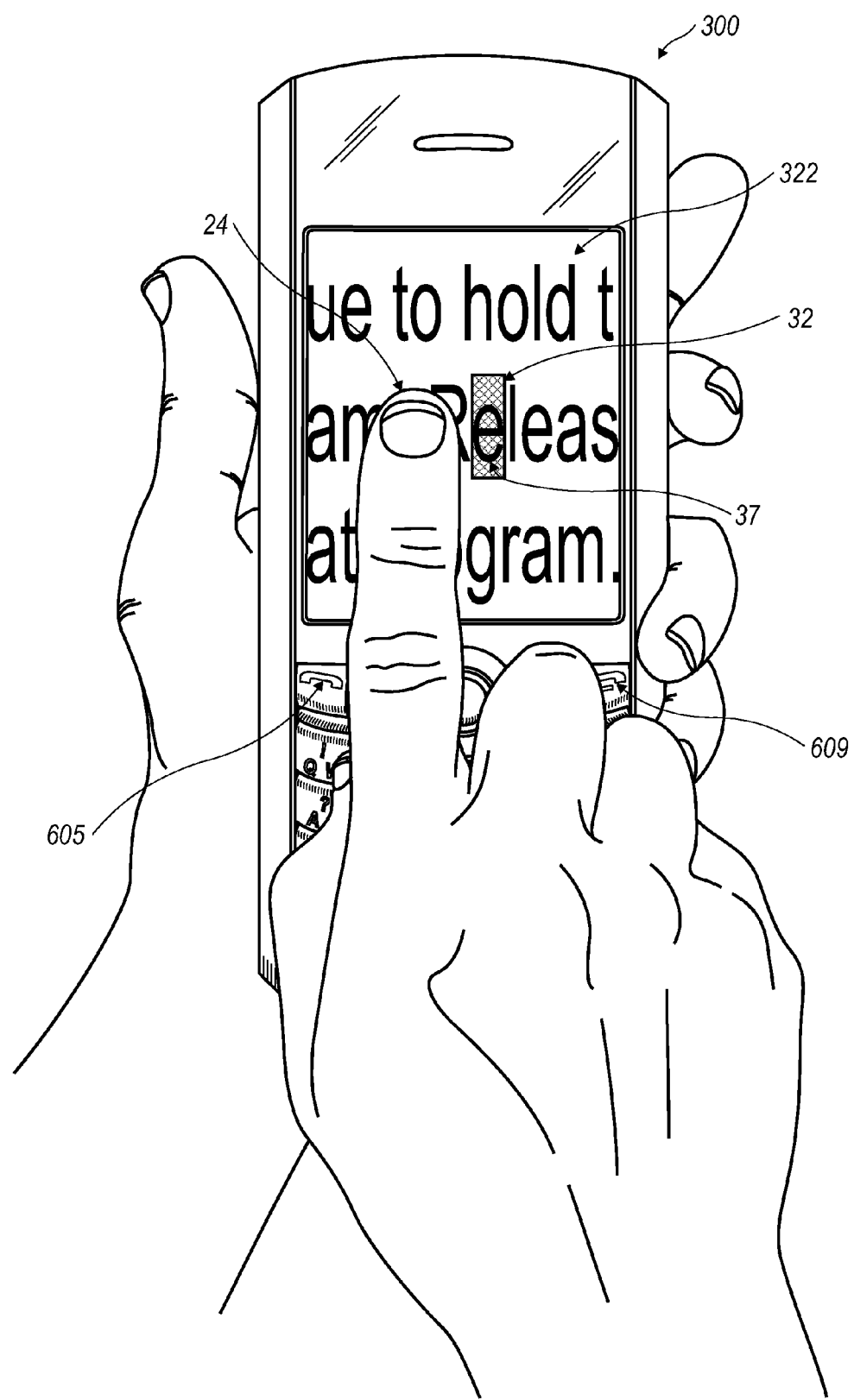
FIG. 6 depicts selection of a second character in the expanded view as displayed on the touch sensitive screen.
Figure 7:
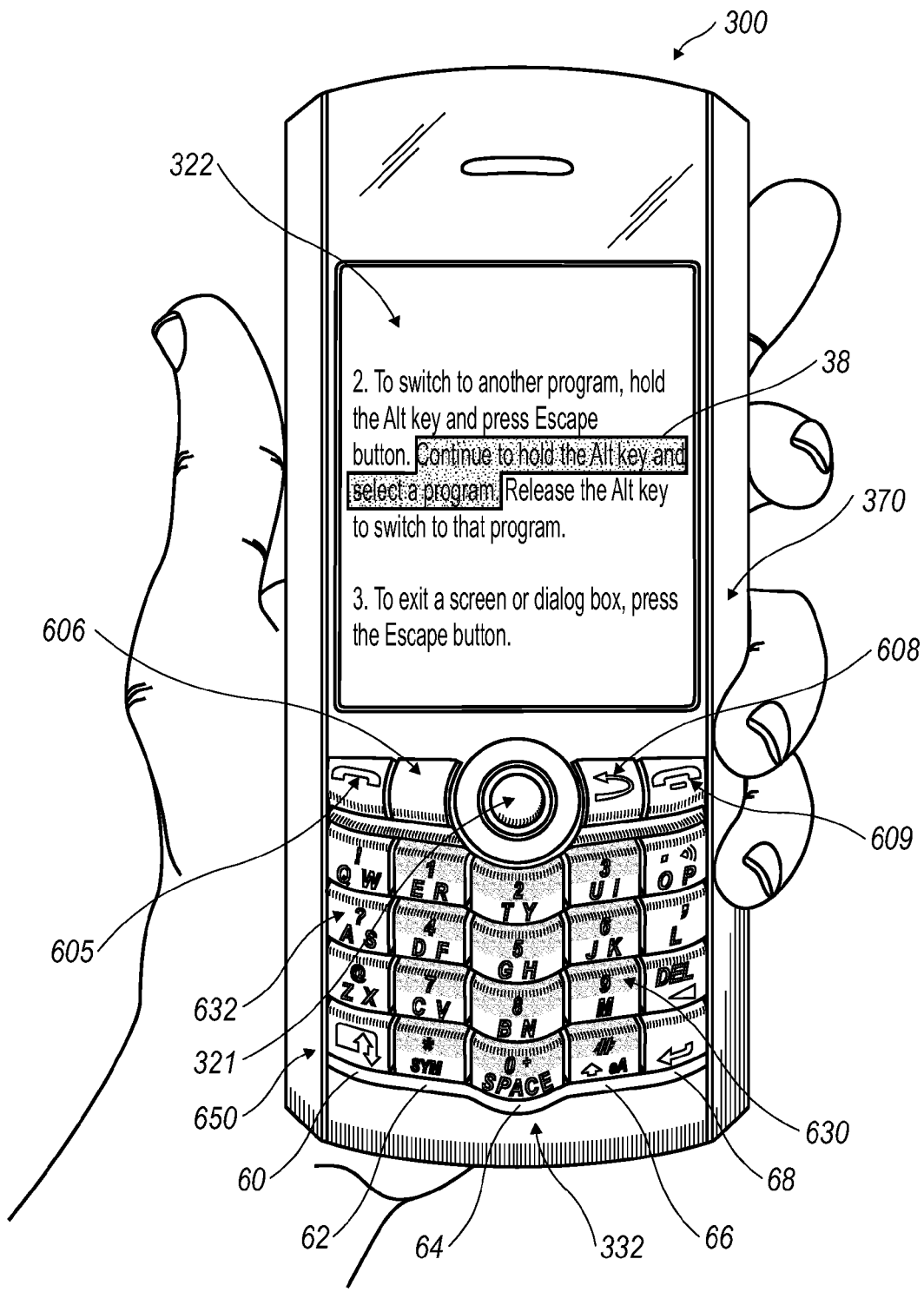
FIG. 7 depicts visually signifying the text between the two selected characters.

While in some embodiments the mere selection of a character is all that is desired, other embodiments further involve selecting a block of text. As continued from the above described circumstance, a second endpoint of the text is selected. This involves a similar process as previously described. As shown in FIG. 5, the original display configuration is shown on the screen 322 and the previously selected character 36 is highlighted by a cursor 30. The user indicates the desire to select another endpoint through selection of a second area on the touch screen 322 through fingertip-engagement 23. Then, a second expanded view, shown in FIG. 6, is displayed on the screen 322 in which the characters are individually sufficiently large, as previously discussed above. The user further refines the previous character selection 37, indicated by cursor 32, by touching the screen 322 at an area 24 corresponding to the desired character. This second character is detected. Then the original display configuration is shown on the screen 322 with the text between the first character and the second character being visually signified 38 as designated text, as shown in FIG. 7. The visual signification of the text between the two characters can be as described previously. Preferably, this text is visually signified by applying background shading to the text.

Figure 8:
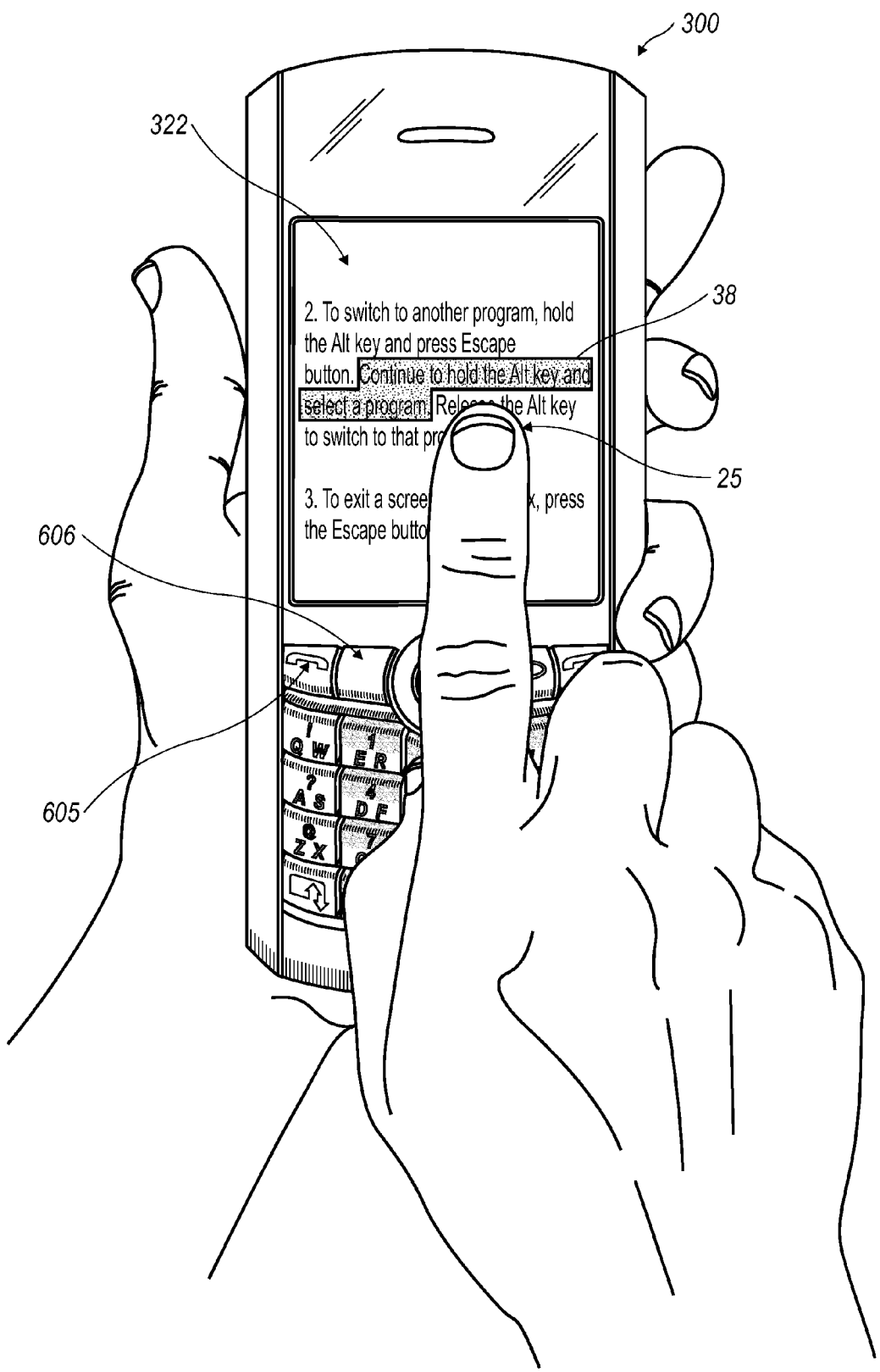
FIG. 8 depicts the selection of a third area when the original display configuration is shown on the screen.
Figure 9:
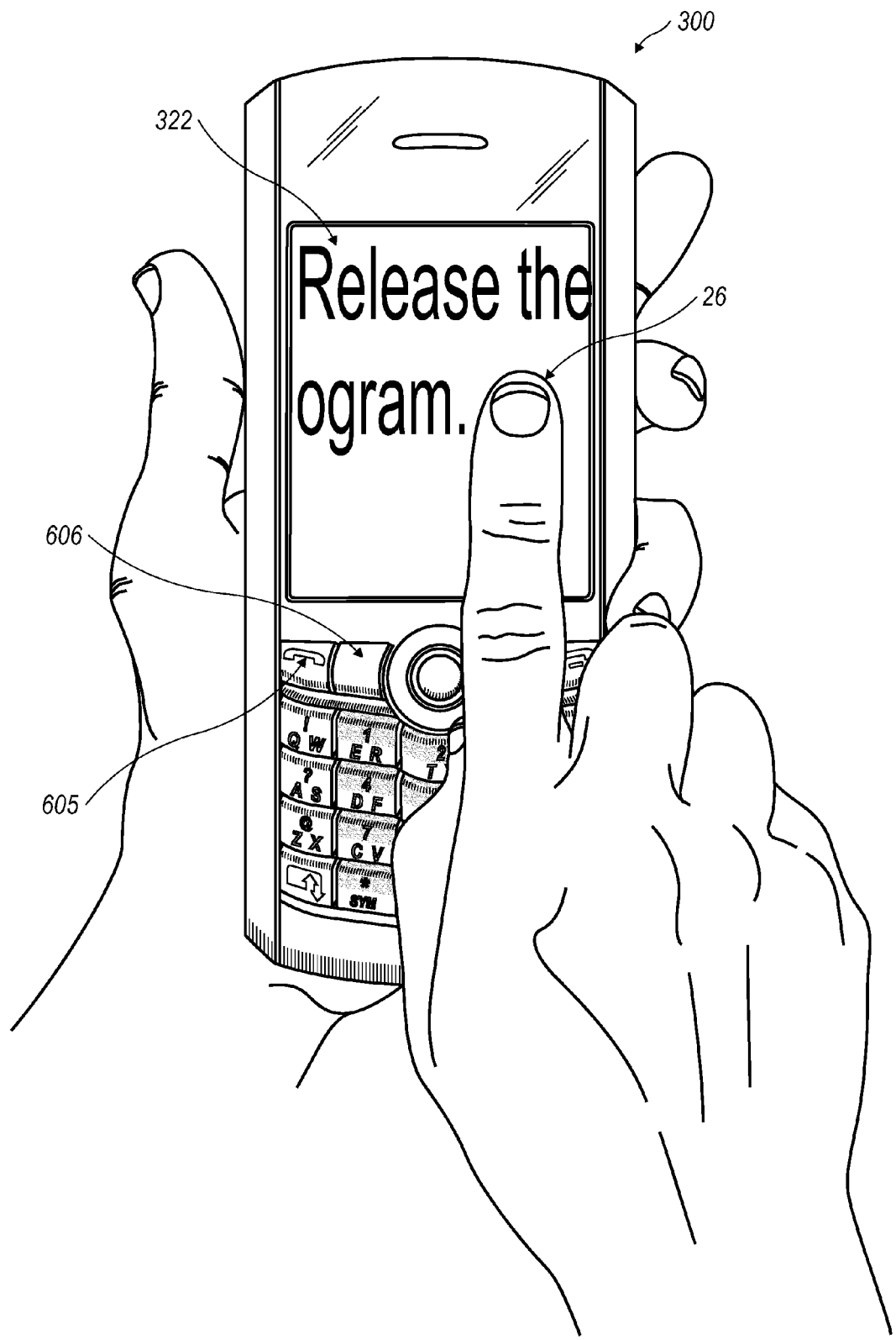
FIG. 9 depicts the selection of a third character.
Figure 10:
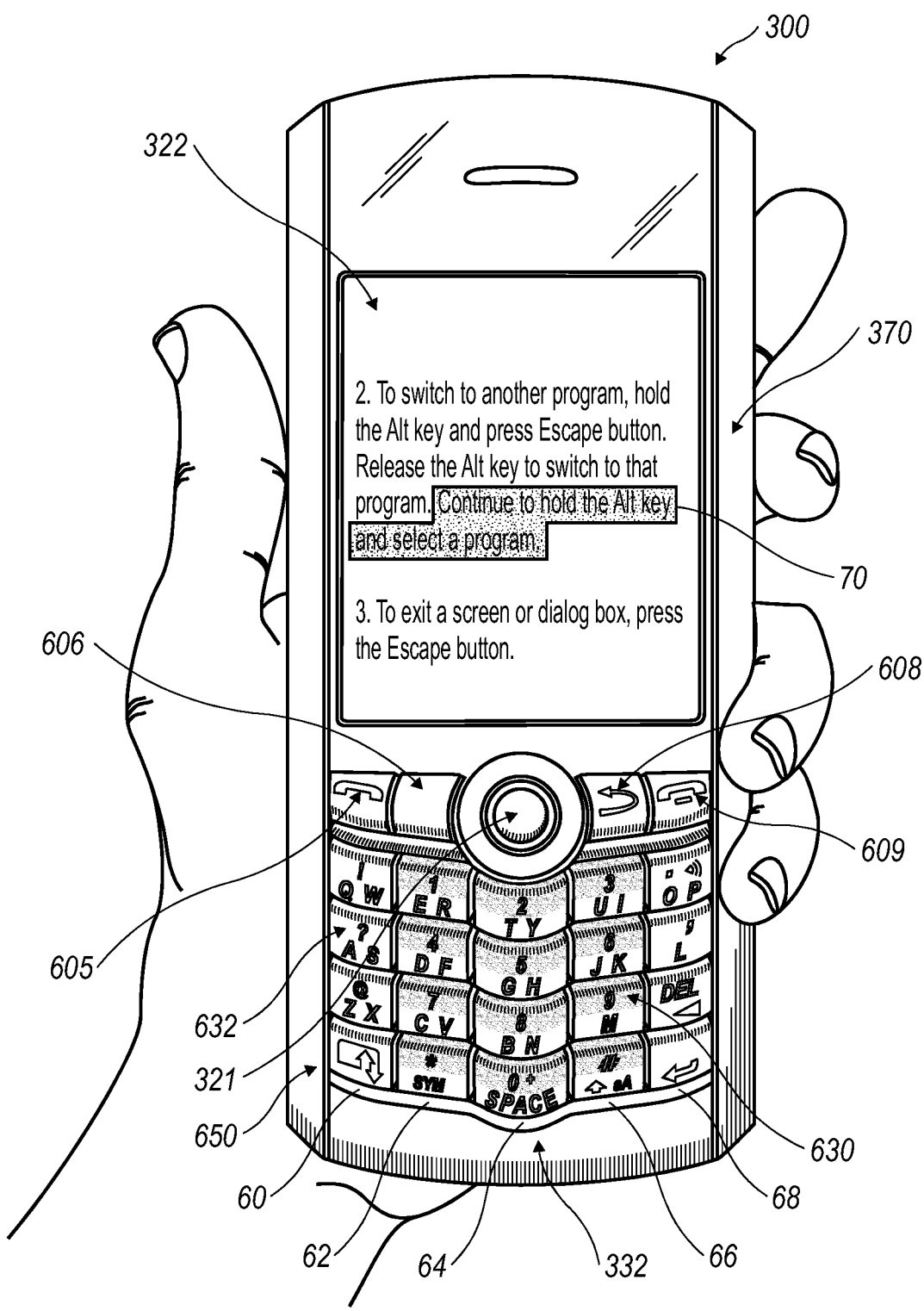
FIG. 10 depicts the original display configuration in which the text between the first two selected characters is cut and inserted after the third selected character.

The selected text can then be inserted at a third point. The finger selects the visually signified text by placing the finger over that area, such that it contacts a portion of the selected text, and drags the text to a third point for insertion. As shown in FIG. 8, when the finger comes to a stop and is removed at a third area 25, an initial point for insertion is specified. Alternatively, a third area 25 is touched on the screen 322 of the device 300. Once the third area is specified, a third expanded view, as shown in FIG. 9, is shown on the screen 322 to allow further refinement of the selected area. Then, the touch screen 322 detects that a third character, in this case a blank space, has been fingertip-selected 26. As can be seen in FIG. 10, the selected text 70 is then inserted at the space adjacent to the third character 26 and the original display configuration is resumed 501.

Figure 12:
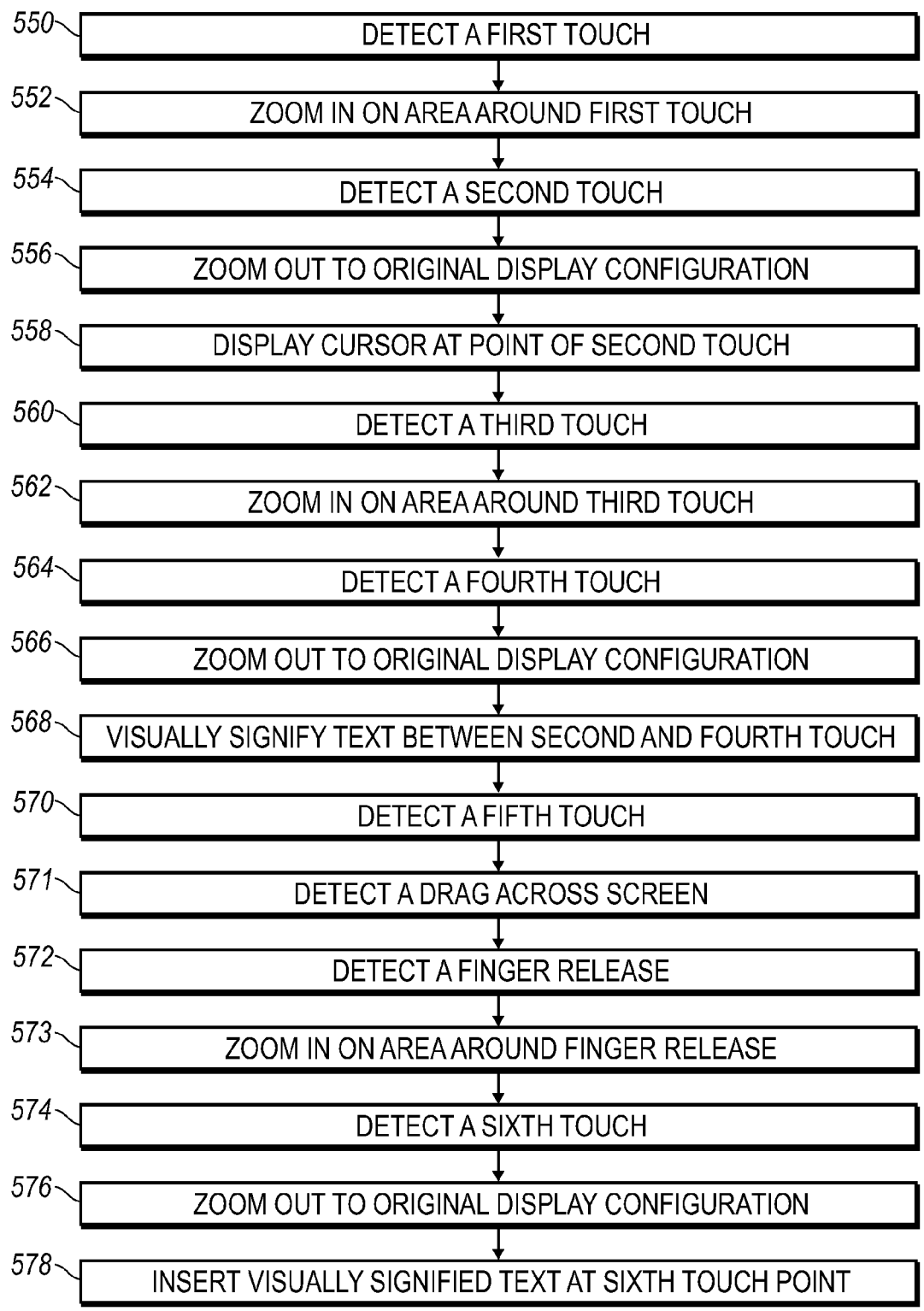
FIG. 12 is a flow chart illustrating another exemplary method for character or text selection.

In another embodiment as shown in FIG. 12, the method for character or text selection can be described as follows. While the screen 322 is displaying text in an ordinary configuration as described above, a first touch on the touch sensitive screen 322 is detected (block 550). Next, a zoom view is implemented in which the area around the first touch is centered on the display 322 and corresponding text is magnified such that the text shown on the display 322 is larger than the original display configuration (block 552). Then, a second touch is detected on the screen 322 (block 554). Once the second touch is detected, the screen 322 resumes the original display configuration by zooming out to this standard configuration (block 556). In the original display configuration, a cursor or other visual indicator is shown at the second touch point (block 558). If the user desired only single character selection, this could be provided through the above provided steps. However if further selection of text is desired, a third touch can be detected on the touch sensitive screen 322 of the device 300 (block 560). Once the third touch is detected, the area surrounding the third touch is magnified to show the text around the third point in larger font size (block 562). Next, a fourth touch is detected (block 564) and display configuration is zoomed out to show the original display configuration (block 566). When the text is shown in the original display configuration, the text appearing between the second and fourth touch is visually signified through one of the above described ways, including a different background (block 568). If further manipulation of the text is required, such as pasting, then a fifth touch can be detected (block 570). Then a dragging motion is detected across the display screen 322 (block 571), followed by a release of the finger (block 572). As previously described in relation to other detections, the area around the finger release is magnified (block 573). At this point, a sixth touch by the user is detected (block 574). Finally, the display 322 resumes the original display configuration (block 576) and the visually signified text is inserted at the sixth point (block 578).

While the above disclosure generally references the selection of characters and text as occurring continuously, other embodiments are considered which provide for only portions or segments of the above described selection and placement of characters or text. Furthermore, the user may be required to enter commands or make menu selections in order to implement the above described character or text manipulation. For example, the user may have to indicate the desire to make a selection by selecting an item from a menu designating character selection. Alternatively, the selection of the text or characters can be made without interaction with a menu, but once the selection is made, a menu selection is required to perform a cut or delete operation on the selected text. Additionally, when inserting the text, a user might be required to select a paste or insert operation from a menu once an insertion point has been specified. Alternatively, the user could select paste and be prompted to select the insertion point. While the above has described the interaction with a program as being through menu selection features, short cut commands that replace the menu selection are also considered within this disclosure. Additionally, gestures may be implemented to enable the text selection and manipulation options.

While a user may complete the text selection process without any problems, other embodiments are considered that allow the user to escape or exit a particular selection. If the user did not like the character selection made, a command key or menu selection can be made to reject the selection. The rejection of the selection can be limited to the previous selection or all selections prior to the decision by the user to reject the selection. These are similar to the well known undo or redo options available in computer programs.

The above described methods and apparatus can combine with the following mentioned elements as one of the ordinary skill in the art may appreciate. Although the method and apparatus has been described in relation to selection of text, the method and apparatus may be implemented to edit and manipulate other objects shown on the screen of the device such as images. In another embodiment, the manipulation of the text is afford through a microprocessor-run software program for a handheld electronic device configured for displaying characters for user selection. The displayed characters are small enough that user contact with the touch screen can overlap a plurality of simultaneously displayed characters. The touch screen mounted within the body and which is arranged to display text in an original display configuration with selectable characters that are smaller than an area of user contact with the screen. The microprocessor, as described above, is in signal communication with the touch screen for receiving data indicative of a sensed location and area of user contact and for transmitting data to the touch screen indicative of characters to be displayed on the touch screen. The microprocessor-run software program is programmed to assess a first area of the touch screen that has been user contacted. The first area encompasses a plurality of characters of which at least two have been partially covered by the user's contact with the touch screen. The microprocessor-run software program can present on the touch screen an expanded view of the first area that has been expanded to an extent that each of the at least two partially covered characters is individually sufficiently large that only one of said at least two characters can be predominantly covered by similar user contact with the touch screen. Furthermore, the microprocessor-run software program can determine that a first character from the at least two characters that is user selected in the first expanded view by being predominantly covered by similar contact with the touch screen in the expanded view. Additionally, the microprocessor-run software program displays text in the original display configuration on the touch screen the first character signified that has been determined as being user selected in the first expanded view.

The microprocessor-run software program can be further programmed to assess that a second area of the touch screen has been user contacted, the second area encompassing a plurality of characters of which at least two have been at least partially covered by the area of user contact with the touch screen. This microprocessor-run software program presents a second expanded view of the second area that has been expanded to an extent that each of the at least two partially covered characters is individually sufficiently large that only one of said at least two characters can be predominantly covered by the user's contact with the touch screen on the touch screen. Furthermore, the microprocessor-run software program determines that a second character from the said at least two characters that is being user selected in the expanded view being predominantly covered by said user contact with the touch screen in said expanded view. Then the microprocessor-run software program causes the display screen to resume the original display configuration of the text with text between said first character and said second character being signified as designated text.

In another embodiment, the microprocessor-run software program assesses that a third area of the touch screen has been user contacted and that the area of contact has moved across the touch screen to a third location where a third area is defined by the user contact, said third area encompassing a plurality of characters of which at least two have been at least partially covered by the user's contact with the touch screen. Furthermore, the microprocessor-run software program can present an expanded view of the third area upon detection that the user contact has disengaged from the touch screen and wherein the expanded view has been expanded to an extent that each of the at least two partially covered characters in the expanded view is individually sufficiently large that only one of said at least two characters can be predominantly covered by the user's contact with the touch screen on the touch screen. The microprocessor-run software program determines that a third character from said at least two characters that is being user selected in the expanded view by being predominantly covered by user contact with the touch screen in said expanded view, and inserts the designated text adjacent the third character and resume the original display configuration. Furthermore, this microprocessor-run software program is capable of executing instructions resulting in the changes discussed above in relation to FIGS. 1-12.

As intimated hereinabove, one of the more important aspects of the handheld electronic device 300 to which this disclosure is directed is its size. While some users will grasp the device 300 in both hands, it is intended that a predominance of users will cradle the device 300 in one hand in such a manner that input and control over the device 300 can be effected using the thumb of the same hand in which the device 300 is held. However, it is appreciated that additional control can be effected by using both hands. As a handheld electronic device 300 that is easy to grasp and desirably pocketable, the size of the device 300 must be kept commensurately small. Of the device's dimensions, limiting its width is important for the purpose of assuring cradleability in a user's hand. Moreover, it is preferred that the width of the device 300 be maintained at less than eight centimeters (approximately three inches). Keeping the device 300 within these dimensional limits provides a hand cradleable unit that users prefer for its usability and portability. Limitations with respect to the height (length) of the device 300 are less stringent when considering hand-cradleability. Therefore, in order to gain greater size, the device 300 can be advantageously configured so that its height is greater than its width, but still remain easily supported and operated in one hand.

A potential problem is presented by the small size of the device 300 in that there is limited exterior surface area for the inclusion of user input and device output features. This is especially true for the "prime real estate" on the front face 370 of the device 300, where it is most advantageous to include a display screen 322 that outputs information to the user. The display screen 322 is preferably located above a keyboard 332 that is utilized for data entry into the device 300 by the user. If the screen 322 is provided below the keyboard 332, a problem occurs in that viewing the screen 322 is inhibited when the user is inputting data using the keyboard 332. Therefore it is preferred that the display screen 322 be above the input area, thereby solving the problem by assuring that the hands and fingers do not block the view of the screen 322 during data entry periods.

To facilitate textual data entry into the device 300, an alphabetic keyboard is provided. In one version, a full alphabetic keyboard is utilized in which there is one letter per alphabetic key. In this regard, the associated letters can be advantageously organized in QWERTY, QWERTZ, AZERTY, or Dvorak layouts, among others, thereby capitalizing on certain users' familiarity with these special letter orders. In order to stay within the bounds of the limited front surface area, however, each of the keys must be commensurately small when, for example, twenty-six keys must be provided in the instance of the English language.

An alternative configuration is to provide a reduced keyboard in which at least some of the keys have more than one letter associated therewith (see FIG. 1 for an example). This means that fewer keys are required which makes it possible for those fewer keys to each be larger than in the instance when a full keyboard is provided on a similarly dimensioned device. Some users will prefer the solution of the larger keys over the smaller ones, but it is necessary that software or hardware solutions be provided in order to discriminate which of the several associated letters the user intends based on a particular key actuation, a problem the full keyboard avoids.

Preferably, the character discrimination is accomplished utilizing disambiguation software included on the device 300. To accommodate software use on the device 300, a memory 324 and microprocessor 338 are provided within the body of the handheld unit for receiving, storing, processing, and outputting data during use. Therefore, the problem of needing a textual data input means is solved by the provision of either a full or reduced alphabetic keyboard on the presently disclosed handheld electronic device 300. It should be further appreciated that the keyboard can be alternatively provided on a touch sensitive screen in either a reduced or full format.

As shown in FIG. 1, the handheld electronic device 300 is cradleable in the palm of a user's hand. The handheld electronic device 300 is provided with a keyboard 332 to enter text data and place telephone calls and a display screen 322 for communicating information to the user. A connect/send key 605 is preferably provided to aid in the placement of a phone call. Additionally, a disconnect/end key 609 is provided. The send key 605 and end key 609 preferably can be arranged in a row of keys including a navigation tool. Additionally, the row of keys, including the navigation tool, preferably has a menu key 606 and a back key or escape key 608. The menu key 606 is used to bring up a menu on the display screen 322 and the escape key 608 is used to return to the previous screen or previous menu selection.

The handheld electronic device 300 includes an input portion and an output display portion. The output display portion can be a display screen 322, such as an LCD or other similar display device.

The keyboard 332 includes a plurality of keys that can be of a physical nature such as actuable buttons or they can be of a software nature, typically constituted by virtual representations of physical keys on a display screen 322 (referred to herein as "virtual keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Specific keys or other types of input devices can be used to navigate through the various applications and features thereof. Further, depending on the application 358 or feature in use, specific keys can be enabled or disabled.

In the case of physical keys, all or a portion of the plurality of keys have one or more indicia, representing character(s), command(s), and/or functions(s), displayed at their top surface and/or on the surface of the area adjacent the respective key. In the instance where the indicia of a key's function is provided adjacent the key, the indicia can be printed on the device cover beside the key, or in the instance of keys located adjacent the display screen 322. Additionally, current indicia for the key may be temporarily shown nearby the key on the screen 322.

In the case of virtual keys, the indicia for the respective keys are shown on the display screen 322, which in one embodiment is enabled by touching the display screen 322, for example, with a stylus to generate the character or activate the indicated command or function. Some examples of display screens 322 capable of detecting a touch include resistive, capacitive, projected capacitive, infrared and surface acoustic wave (SAW) touchscreens.

Physical and virtual keys can be combined in many different ways as appreciated by those skilled in the art. In one embodiment, physical and virtual keys are combined such that the plurality of enabled keys for a particular application or feature of the handheld electronic device 300 is shown on the display screen 322 in the same configuration as the physical keys. Using this configuration, the user can select the appropriate physical key corresponding to what is shown on the display screen 322. Thus, the desired character, command or function is obtained by depressing the physical key corresponding to the character, command or function displayed at a corresponding position on the display screen 322, rather than touching the display screen 322.

Figure 14:
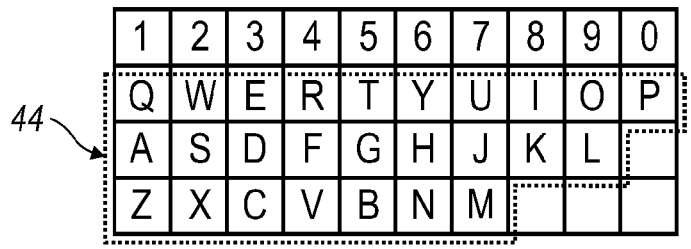
FIG. 14 illustrates an exemplary QWERTY keyboard layout.
Figure 15:
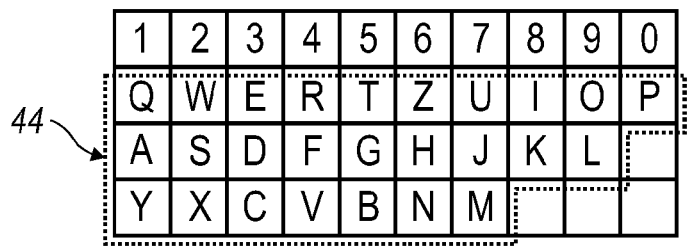
FIG. 15 illustrates an exemplary QWERTZ keyboard layout.
Figure 16:
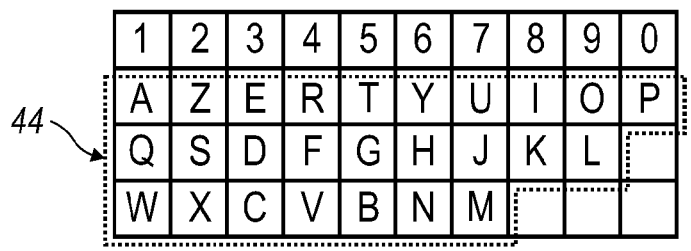
FIG. 16 illustrates an exemplary AZERTY keyboard layout.

The various characters, commands and functions associated with keyboard typing in general are traditionally arranged using various conventions. The most common of these in the United States, for instance, is the QWERTY keyboard layout. Others include the QWERTZ, AZERTY, and Dvorak keyboard configurations. The QWERTY keyboard layout is the standard English-language alphabetic key arrangement 44 shown in FIG. 14. The QWERTZ keyboard layout is normally used in German-speaking regions; this alphabetic key arrangement 44 is shown in FIG. 15. The AZERTY keyboard layout 44 is normally used in French-speaking regions and is shown in FIG. 16. The Dvorak keyboard layout was designed to allow typists to type faster; this alphabetic key arrangement 44 is shown in FIG. 17. In other exemplary embodiments, keyboards having multi-language key arrangements can be contemplated.

Alphabetic key arrangements are often presented along with numeric key arrangements. Typically, the numbers 1-9 and 0 are positioned in the row above the alphabetic keys 44, as shown in FIG. 14-17. Alternatively, the numbers share keys with the alphabetic characters, such as the top row of the QWERTY keyboard. Yet another exemplary numeric key arrangement is shown in FIG. 18, where a "ten-key" style numeric keypad 46 is provided on a separate set of keys that is spaced from the alphabetic/numeric key arrangement 44. Still further, ten-key numeric arrangements may be common with or shared with a subset of the alphabetic keys. The ten-key styled numeric keypad 46 includes the numbers "7", "8", "9" arranged in a top row, "4", "5", "6" arranged in a second row, "1", "2", "3" arranged in a third row, and "0" in a bottom row. Further, a numeric phone key arrangement 42 is exemplarily illustrated in FIG. 19.

As shown in FIG. 19, the numeric phone key arrangement 42 may also utilize a surface treatment on the surface of the center "5" key. This surface treatment is configured such that the top surface of the key is distinctive from the surface of other keys. Preferably the surface treatment is in the form of a raised bump or recessed dimple 43. Alternatively, raised bumps may be positioned on the housing around the "5" key and do not necessarily have to be positioned directly on the key.

It is desirable for handheld electronic devices 300 to include a combined text-entry keyboard and a telephony keyboard. Examples of such handheld electronic devices 300 include mobile stations, cellular telephones, wireless personal digital assistants (PDAs), two-way paging devices, and others. Various keyboards are used with such devices and can be termed a full keyboard, a reduced keyboard, or phone key pad. In embodiments of a handheld electronic device 300 having a full keyboard, the alphabetic characters are singly associated with the plurality of physical keys. Thus, in an English-language keyboard of this configuration, there are at least 26 keys in the plurality so that there is one letter per alphabetic key.

FIGS. 19 and 20 both feature numeric keys arranged according to the ITU Standard E. 161 form. In addition, FIG. 20 also incorporates alphabetic characters according to the ITU Standard E. 161 layout as well.

As intimated above, in order to further reduce the size of a handheld electronic device 300 without making the physical keys or virtual keys too small, some handheld electronic devices 300 use a reduced keyboard, where more than one character/command/function is associated with each of at least a portion of the plurality of keys. This results in certain keys being ambiguous since more than one character is represented by or associated with the key, even though only one of those characters is typically intended by the user when activating the key.

Thus, certain software usually runs on the processor 338 of these types of handheld electronic devices 300 to determine or predict what letter or word has been intended by the user. Some examples of software include predictive text routines which typically include a disambiguation engine and/or predictive editor application. The software preferably also has the ability to recognize character letter sequences that are common to the particular language, such as, in the case of English, words ending in "ing." Such systems can also "learn" the typing style of the user making note of frequently used words to increase the predictive aspect of the software. Other types of predictive text computer programs may be utilized with the reduced keyboard arrangements described herein, without limitation. Some specific examples include the multi-tap method of character selection and "text on nine keys".

The keys of reduced keyboards are laid out with various arrangements of characters, commands and functions associated therewith. In regards to alphabetic characters, the different keyboard layouts identified above are selectively used based on a user's preference and familiarity; for example, the QWERTY keyboard layout is most often used by English speakers who have become accustomed to the key arrangement.

FIG. 1 shows a handheld electronic device 300 that carries an example of a reduced keyboard using the QWERTY keyboard layout on a physical keyboard array of twenty keys comprising five columns and four rows. Fourteen keys are used for alphabetic characters and ten keys are used for numbers. Nine of the ten numbers share a key with alphabetic characters. The "space" key and the number "0" share the same key, which is centered on the device and centered below the remainder of the numbers on the keyboard 332. While in other embodiments, the number "0" may be located on other keys. Many of the keys have different sizes than the other keys, and the rows are non-linear. In particular, the keys in the middle column 64 are wider than keys in the outer columns 60, 62, 66 and 68. To readily identify the phone user interface (the second user interface), the numeric phone keys 0-9 include a color scheme that is different from that of the remaining keys associated with the QWERTY key arrangement. In the exemplary embodiment illustrated in FIG. 1, the keyboard includes a color scheme of the numeric phone keys has a two tone appearance, with the upper portion of the numeric keys being a first color and the lower portion of the numeric keys being a second color. The first color may be lighter than the second color, or darker than the second color.

Another embodiment of a reduced alphabetic keyboard is found on a standard phone keypad 42. Most handheld electronic devices 300 having a phone key pad 42 also typically include alphabetic key arrangements overlaying or coinciding with the numeric keys as shown in FIG. 20. Such alphanumeric phone keypads are used in many, if not most, traditional handheld telephony mobile communication devices such as cellular handsets.

As described above, the International Telecommunications Union ("ITU") has established phone standards for the arrangement of alphanumeric keys. The standard phone numeric key arrangement shown in FIGS. 19 (no alphabetic letters) and 20 (with alphabetic letters) corresponds to ITU Standard E.161, entitled "Arrangement of Digits, Letters, and Symbols on Telephones and Other Devices That Can Be Used for Gaining Access to a Telephone Network." This standard is also known as ANSI TI.703-1995/1999 and ISO/IEC 9995-8:1994. As shown in FIG. 1, the numeric key arrangement can be overlaid on a QWERTY arrangement. The numeric arrangement as shown can be aptly described as a top-to-bottom ascending order three-by-three-over-zero pattern While several keyboard layouts have been described above, the layouts can be described as having keys disposed on the keyboard in a QWERTY, reduced QWERTY, QWERTZ, Dvorak, or AZERTY key layout. These familiar keyboard layouts allow users to type more intuitively and quickly than, for example, on the standard alphabetic layout on a telephone pad. As mentioned above, the key arrangements can be reduced compared to a standard layout through the use of more than one letter or character per key. By utilizing fewer keys, the keys can be made larger and therefore more convenient to the user.

Exemplary embodiments have been described hereinabove regarding both handheld electronic devices, as well as the communication networks within which they cooperate. It should be appreciated, however, that a focus of the present disclosure is the enablement of a user of such wireless handheld electronic devices to select and edit text or characters through a touch sensitive screen, which displays an original configuration and an expanded view as needed.

What is claimed is:

1. A method comprising:
   displaying text on a touch screen in an original configuration;
   detecting a touch associated with a first area of the touch screen;
   displaying an enlarged view of the first area comprising at least two characters of the text;
   detecting selection of a first character from the at least two characters;
   resuming the original configuration after detecting the selection of the first character, wherein the first character is shown as designated text when the original configuration is resumed.

2. The method of claim 1, further comprising:
   detecting a touch associated with a second area of the touch screen;
   displaying an enlarged view of the second area comprising a plurality of characters of the text;
   detecting selection of a second character from the plurality of characters;
   resuming the original configuration with text between the first character and the second character signified as designated text.

3. The method of claim 1, further comprising:
   detecting a third touch associated with a third area of the touch screen and that the third touch moved across the touch screen to a third location, the third area encompassing a plurality of characters of which at least two are at least partially covered by the third touch;
   displaying an enlarged view of the third area comprising at least a third character of the text;
   detecting selection of the third character;
   inserting the designated text adjacent the third character and resuming the original configuration.

4. The method of claim 1, wherein the original configuration is a default view.

5. The method of claim 1, further comprising performing text editing on the designated text.

6. The method of claim 1, wherein the first character and the second character are visually signified as designated text.

7. The method of claim 1, wherein more than three lines of text are shown when in the original configuration.

8. The method of claim 1, wherein less than four lines of text are displayed in the first enlarged view.

9. The method of claim 1, wherein at least one line of text above and one line of text below the first area are displayed in the enlarged view.

10. The method of claim 1, wherein less than six characters are displayed on either side of the first area in the enlarged view.

11. The method of claim 1, wherein the characters that are individually sufficiently large have a height greater than six millimeters.

12. The method of claim 1, further comprising performing a text editing function on the designated text.

13. A computer-readable medium having computer-readable code executable by at least one processor to perform the method of claim 1.

14. The method of claim 1, wherein a most-likely character associated with the touch is visually signified in the enlarged view.

15. The method of claim 1, wherein the enlarged view shows all characters as larger than those characters are shown in the original configuration.

16. The method of claim 1, wherein the enlarged view of the first area comprises at least one line of text above and one line of text below the first character.

17. An electronic device comprising:
   a touch screen arranged to display text in an original display configuration;
   a microprocessor in communication with the touch screen for receiving data indicative of a location and area of contact;
   a processor configured to:
      detect a touch associated with a first area of the touch screen;
      display an enlarged view of the first area comprising at least two characters of the text that can be predominantly covered by contact with the touch screen;
      detect selection of a first character from the at least two characters;
      display text in the original display configuration in response to detecting the selection of the first character, wherein the first character is signified as designated text in the original display configuration.

18. The electronic device of claim 17, wherein the processor is further configured to perform a text editing function on the designated text.

19. The electronic device of claim 17, wherein the processor is further configured to:

detect a touch associated with a third area of the touch screen;
display an enlarged view of the third area comprising at least a third character of the text;
detect selection of the third character;
insert the designated text adjacent to the third character and resume the original display configuration.

20. The electronic device of claim 17, wherein the processor is further configured to:
detect a touch associated with a second area of the touch screen;
display an enlarged view of the second area comprising a plurality of characters of the text;
detect selection of a second character from the plurality of characters;
resume the original configuration with text between the first character and the second character signified as designated text.

21. The electronic device of claim 17, wherein the processor is further configured to visually signify in the enlarged view a most-likely character associated with the touch.

22. The electronic device of claim 17, wherein in the enlarged view all characters are shown larger than those characters are shown in the original configuration.

23. The electronic device of claim 17, wherein the enlarged view of the first area comprises at least one line of text above and one line of text below the first character.

24. A method comprising:
displaying text on a touch screen in an original configuration;
detecting a touch associated with a first area of the touch screen;
determining a most likely character associated with the touch;
displaying an enlarged view of the first area comprising at least two characters of the text including the most likely character associated with the touch, wherein the most likely character associated with the touch is shown as a designated character;
detecting selection of a first character from the at least two characters;
resuming the original configuration after detecting the selection of the first character, wherein the first character is shown as designated text when the original configuration is resumed.

25. A method comprising:
displaying text on a touch screen in an original configuration;
detecting a touch associated with a first area of the touch screen;
displaying an enlarged view of the first area;
detecting selection of a first character from the enlarged view of the first area;
resuming the original configuration after detecting the selection of the first character, wherein the first character is shown as designated text when the original configuration is resumed;
detecting a touch associated with a second area of the touch screen;
displaying an enlarged view of the second area;
detecting selection of a second character from the enlarged view of the second area;
resuming the original configuration with text between the first character and the second character signified as designated text.

* * * * *